(12) United States Patent
Ishiguro

(10) Patent No.: US 8,681,295 B2
(45) Date of Patent: Mar. 25, 2014

(54) VA-MODE LIQUID-CRYSTAL DISPLAY DEVICE

(75) Inventor: Makoto Ishiguro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 43 days.

(21) Appl. No.: 13/512,560

(22) PCT Filed: Nov. 29, 2010

(86) PCT No.: PCT/JP2010/071761
§ 371 (c)(1),
(2), (4) Date: May 29, 2012

(87) PCT Pub. No.: WO2011/065588
PCT Pub. Date: Jun. 3, 2011

(65) Prior Publication Data
US 2012/0236233 A1    Sep. 20, 2012

(30) Foreign Application Priority Data

Nov. 30, 2009    (JP) .................................. 2009-272887

(51) Int. Cl.
*G02F 1/1335* (2006.01)

(52) U.S. Cl.
USPC .............................. 349/117; 349/96; 349/118

(58) Field of Classification Search
USPC .......................................... 349/96, 117, 118
See application file for complete search history.

(56) References Cited

U.S. PATENT DOCUMENTS

| | | |
|---|---|---|
| 6,650,390 B2 | 11/2003 | Sakamoto et al. |
| 7,951,430 B2 | 5/2011 | Sugiyama et al. |
| 8,049,850 B2 | 11/2011 | Sugiyama et al. |
| 8,184,244 B2 | 5/2012 | Ueda et al. |
| 2001/0019392 A1 | 9/2001 | Sakamoto et al. |
| 2003/0086041 A1 | 5/2003 | Watanabe et al. |
| 2006/0164580 A1 | 7/2006 | Ueda et al. |
| 2007/0029550 A1 | 2/2007 | Yoshida et al. |
| 2008/0158488 A1 | 7/2008 | Yanai et al. |
| 2009/0051856 A1 | 2/2009 | Sugiyama et al. |
| 2009/0096966 A1 | 4/2009 | Umemoto et al. |

(Continued)

FOREIGN PATENT DOCUMENTS

| | | |
|---|---|---|
| JP | 2001-249350 A | 9/2001 |
| JP | 2003-156743 A | 5/2003 |

(Continued)

OTHER PUBLICATIONS

Office Action issued by JPO on Jul. 23, 2013 in connection with corresponding Japanese Patent Application No. 2010-070128.

(Continued)

*Primary Examiner* — Lucy Chien
(74) *Attorney, Agent, or Firm* — Jean C. Edwards, Esq.; Edwards Neils PLLC

(57) ABSTRACT

A VA-mode liquid-crystal display device comprising a front-side polarizing element, a rear-side polarizing element, a VA-mode liquid-crystal cell disposed between the front-side polarizing element and the rear-side polarizing element, and a rear-side retardation region composed of one or more retardation layers disposed between the rear-side polarizing element and the VA-mode liquid-crystal is disclosed. In the device, the cell satisfies following formulas (1) and (2); and the rear-side retardation region satisfies following formula (3); (1) $3.0 \leq \{\text{the member CR(front)/the member CR(rear)}\}$; (2) the front-member scattering intensity $\leq 1/38000$; (3) $25 \text{ nm} \leq Rth(550) \leq 90 \text{ nm}$.

14 Claims, 1 Drawing Sheet

(56) References Cited

U.S. PATENT DOCUMENTS

| | | | |
|---|---|---|---|
| 2009/0122243 A1 | 5/2009 | Sugiyama et al. | |
| 2009/0128743 A1 | 5/2009 | Akao et al. | |
| 2009/0153784 A1 | 6/2009 | Kiya | |
| 2009/0207347 A1 | 8/2009 | Shimizu et al. | |
| 2010/0220272 A1 | 9/2010 | Ohashi et al. | |
| 2011/0058131 A1* | 3/2011 | Ishiguro | 349/117 |

FOREIGN PATENT DOCUMENTS

| | | |
|---|---|---|
| JP | 2005-003733 A | 1/2005 |
| JP | 2005-099499 A | 4/2005 |
| JP | 2005-258004 A | 9/2005 |
| JP | 2009-098667 A | 5/2006 |
| JP | 2006-184640 A | 7/2006 |
| JP | 2006-234848 A | 9/2006 |
| JP | 2006-241293 A | 9/2006 |
| JP | 2007-047202 A | 2/2007 |
| JP | 2007-133379 A | 5/2007 |
| JP | 2007-164125 A | 6/2007 |
| JP | 2007-171577 A | 7/2007 |
| JP | 2007-212603 A | 8/2007 |
| JP | 4015840 B2 | 9/2007 |
| JP | 2007-279083 A | 10/2007 |
| JP | 2008-015307 A | 1/2008 |
| JP | 2008-216416 A | 9/2008 |
| JP | 2009-093166 A | 4/2009 |
| JP | 2009-139967 A | 6/2009 |
| JP | 2009-204851 A | 9/2009 |
| JP | 2009-258640 A | 11/2009 |
| WO | 2006/070936 A1 | 7/2006 |
| WO | 2006/093346 A1 | 9/2006 |

OTHER PUBLICATIONS

Official Action issued by JPO on Oct. 22, 2013 in connection with corresponding Japanese Patent Application No. 2010-070128.
Non-Final Office Action issued by USPTO on Jan. 30, 2014 in connection with related U.S. Appl. No. 13/512,562.

* cited by examiner

VA-MODE LIQUID-CRYSTAL DISPLAY DEVICE

CROSS-REFERENCE TO RELATED APPLICATIONS

The present invention is a 35 U.S.C. 371 National Stage Entry of PCT/JP2010/071761, filed Nov. 29, 2010, which claims priority from Japanese Patent Application No. 2009-272887, filed on Nov. 30, 2009, the contents of all of which are herein incorporated by reference in their entirety.

TECHNICAL FIELD

The present invention relates to a VA (vertically aligned)-mode liquid-crystal display device improved in the front contrast ratio.

BACKGROUND ART

These days elevation of the contrast ratio (CR) in liquid-crystal display devices is being promoted. In particular, a VA-mode liquid-crystal display device has the advantage that CR in the normal direction (hereinafter referred to as "front CR", and ""front CR" may be generally called also as "on-axis contrast ratio") is high as compared with that in other modes, and various studies and developments are now made for further enhancing the advantage. As a result, in these 6 years, the front CR in VA-mode liquid-crystal display devices has increased from about 400 to about 8000, or by about 20 times.

On the other hand, in liquid-crystal display devices, it is important that not only the front CR is high but also CR in oblique directions (hereinafter this may be referred to as "viewing angle CR") is high. Various techniques of using a retardation film have been proposed for reducing the light leakage in oblique directions in the black state in VA-mode liquid-crystal display devices (for example, JP-A 2006-184640). In general, a retardation film is disposed on both the front side and the rear side of the liquid-crystal cell existing in the center therebetween, in which the two retardation films share retardation necessary for optical compensation in the display device. In general, two systems are employed for the combination for optical compensation. In one system, the retardation films each separately disposed on the front side and on the rear side equally share the same retardation; and the advantage of the system is that the films of the same type can be used therein. In the other system, the retardation film disposed on either one side is made to share a larger retardation; and the system is advantageous in point of the cost since it enables optical compensation by the use of a combination of inexpensive retardation films. In the latter system, in general, the retardation film to be disposed on the rear side is made to share a larger retardation in practical use. One reason is the production cost. Regarding this reason, JP-A2006-241293 says in the paragraph [0265] as follows: "In case where the cellulose acylate-base film of the invention is used only as the protective film of one polarizing plate (between the liquid-crystal cell and the polarizing film), this may be on either side of the upper polarizing plate (viewers' side) or the lower polarizing plate (backlight side) with no functional problem. However, when it is used on the side of the upper polarizing plate, the functional film must be provided on the viewers' side (upper side) and the producibility may be thereby lowered, and therefore, it may be used on the side of the lower polarizing plate in many cases, and this may be a more preferred embodiment." The second reason is that disposing the film having a larger retardation on the rear side is preferred from the viewpoint of the impact resistance and the resistance to environmental change including temperature change and humidity change.

Heretofore, nothing has been investigated about the relationship between the optical properties and the front CR of the retardation film used for improving the viewing angle contrast ratio.

SUMMARY OF INVENTION

For high-CR liquid-crystal display devices, it is difficult to further elevate the contrast ratio according to the previous techniques proposed in the consideration of the CR-reduction factors. The present inventor has assiduously studied and, as a result, has found that in a VA-mode liquid-crystal display device, retardation of the retardation layer disposed between the rear-side polarizing element and the liquid-crystal cell, which heretofore has not been considered to have some influence on the front CR, is one factor of reducing the front CR.

An object of the present invention is to provide a VA-mode liquid-crystal display device having a high front contrast ratio.

The means for achieving the object is as follows.

[1] A VA-mode liquid-crystal display device comprising:
a front-side polarizing element,
a rear-side polarizing element,
a VA-mode liquid-crystal cell disposed between the front-side polarizing element and the rear-side polarizing element, and
a rear-side retardation region composed of one or more retardation layers disposed between the rear-side polarizing element and the VA-mode liquid-crystal cell, wherein:
the liquid-crystal cell comprises a liquid-crystal layer, and a pair of a front-side substrate and a rear-side substrate to hold the liquid-crystal layer therebetween;
the ratio of the member contrast ratio of the front-side substrate (the member CR(front)) to the member contrast ratio of the rear-side substrate (the member CR(rear)), (the member CR(front)/the member CR(rear)) satisfies following formula (1):

$$3.0 \le \{\text{the member CR(front)/the member CR(rear)}\}; \quad (1)$$

the total scattering intensity of the front-side substrate and all the members formed on the front-side substrate (hereinafter this is referred to as "the front-member scattering intensity") satisfies the following formula (2):

$$\text{The front-member scattering intensity} \le 1/38000; \quad (2)$$

wherein the front-member scattering intensity is the difference between the reciprocal of the contrast ratio of all the substrate and all the members formed on the substrate, as measured by the use of a polarizing plate 2 of a combination of a high-retardation film and a polarizing element (the member CR(front 2)), and the reciprocal of the contrast ratio thereof, as measured by the use of a polarizing plate 1 of a combination of a low-retardation film and a polarizing element (member CR(front 1)), and this is computed according to the following formula:

The front-member scattering intensity={1/The member CR(front 2)−1/The member CR(front 1)};
and the rear-side retardation region satisfies the following formula (3):

$$25 \text{ nm} \le Rth(550) \le 90 \text{ nm} \quad (3)$$

wherein Rth(λ) means retardation along the thickness-direction (nm) at a wavelength λ nm.

[2] The VA-mode liquid-crystal display device of [1], wherein the rear-side retardation region satisfies following formula (4):

$$|Re(550)| \leq 20 \text{ nm} \qquad (4)$$

wherein Re(λ) means retardation in plane (nm) at a wavelength λ nm.

[3] The VA-mode liquid-crystal display device of [1] or [2], which further comprises a front-side retardation region composed of one or more retardation layers disposed between the front-side polarizing element and the VA-mode liquid-crystal cell, and wherein the front-side retardation region satisfies following formulae (5) and (6):

$$30 \text{ nm} \leq Re(550) \leq 90 \text{ nm, and} \qquad (5)$$

$$170 \text{ nm} \leq Rth(550) \leq 300 \text{ nm}. \qquad (6)$$

[4] The VA-mode liquid-crystal display device of any one of [1]-[3], wherein the rear-side retardation region satisfies the following two formulae:

$$|Rth(450)|/|Rth(550)| \leq 1, \text{ and}$$

$$1 \leq |Rth(630)|/|Rth(550)|.$$

[5] The VA-mode liquid-crystal display device of any one of [1]-[4], further comprising a color filter disposed in the liquid crystal cell, wherein the color filter satisfies the following two formulae:

$$|Rth(450)|/|Rth(550)| \leq 1, \text{ and}$$

$$1 \leq |Rth(630)| \leq |Rth(550)|.$$

[6] The VA-mode liquid-crystal display device of any one of [1]-[5], wherein the rear-side retardation region is formed of a cellulose acylate-base film or comprises a cellulose acylate-base film.

[7] The VA-mode liquid-crystal display device of any one of [1]-[6], wherein the rear-side retardation region is formed of an acryl-base polymer film or comprises an acryl-base polymer film.

[8] The VA-mode liquid-crystal display device of [7], wherein the rear-side retardation region is formed of an acryl-base polymer film comprising an acryl-base polymer having at least one unit selected from lactone ring units, maleic anhydride units and glutaric anhydride units, or comprises the acryl-base polymer film.

[9] The VA-mode liquid-crystal display device of any one of [1]-[8], wherein the rear-side retardation region is formed of a cyclic olefin-base polymer film or comprises a cyclic olefin-base polymer film.

[10] The VA-mode liquid-crystal display device of any one of [1]-[9] wherein the front-side retardation region is formed of one biaxial polymer film or comprises one biaxial polymer film.

[11] The VA-mode liquid-crystal display device of any one of [1]-[10], wherein the front-side retardation region comprises one monoaxial polymer film.

[12] The VA-mode liquid-crystal display device of [10] or [11], wherein one biaxial polymer film or one monoaxial polymer film is a cellulose acylate-base film.

[13] The VA-mode liquid-crystal display device of [10] or [11], wherein one biaxial polymer film or one monoaxial polymer film is a cyclic olefin-base polymer film.

[14] The VA-mode liquid-crystal display device of any one of [1]-[13], of which the front contrast ratio is equal to or higher than 1500.

[15] The VA-mode liquid-crystal display device of any one of [1]-[14], which comprises a backlight unit sequentially emitting independent three primary colors and which is driven according to a field sequential driving system.

According to the present invention, it is possible to provide a VA-mode liquid-crystal display device having a high front contrast ratio.

Figure 1:
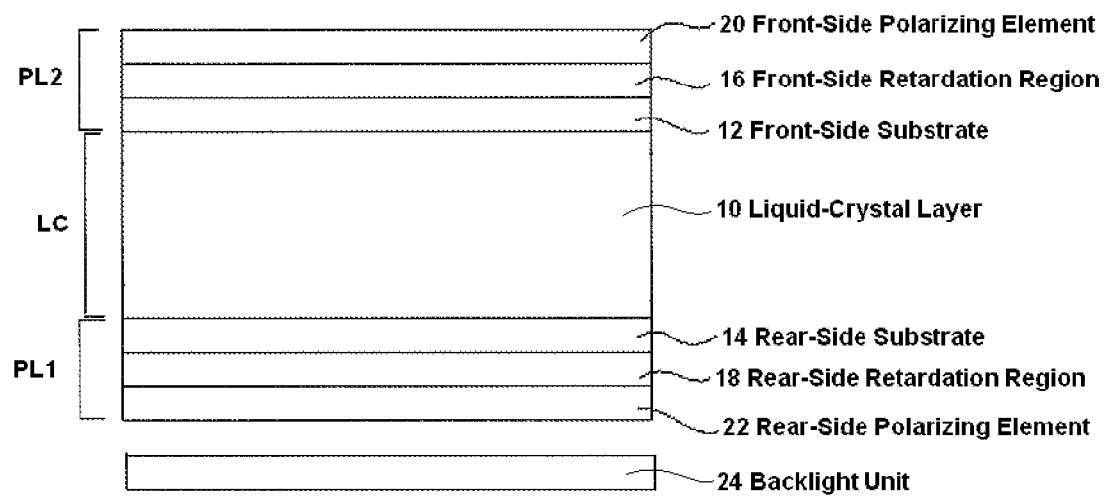
FIG. 1 is a schematic cross-sectional view of one example of the VA-mode liquid-crystal display device of the invention.

In the drawings, the reference numerals and signs have the following meanings.
10 Liquid-Crystal Layer
12 Front-Side Substrate
14 Rear-Side Substrate
16 Front-Side Retardation Region
18 Rear-Side Retardation Region
20 Front-Side Polarizing Element
22 Rear-Side Polarizing Element
24 Backlight Unit
LC Liquid-Crystal Cell
PL1 Rear-Side Polarizing plate
PL2 Front-Side Polarizing plate

MODE FOR CARRYING OUT THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

At first, the terms used in the description will be explained.
(Retardation, Re and Rth)

In this description, Re(λ) and Rth(λ) are retardation in plane (nm) and retardation along the thickness direction (nm), respectively, at a wavelength of λ. Re(λ) is measured by applying light having a wavelength of λ nm to a sample such as a film in the normal direction thereof, using KOBRA 21ADH or WR (by Oji Scientific Instruments). The standard wavelength of KOBRA is 590 nm.

When a sample to be analyze by a monoaxial or biaxial index ellipsoid, Rth(λ) of the film is calculated as follows.

Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth(λ) of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (X) and (XI):

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)} \quad (X)$$

$$Rth = \left(\frac{nx+ny}{2} - nz\right) \times d \quad (XI)$$

wherein Re(θ) represents a retardation value in the direction tilted by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this description, the values of Re(λ) and Rth(λ) such as Re(450), Re(550), Re(630), Rth(450), Rth(550) and Rth (630) are computed from the data of Re and Rth measured with a measuring device at three or more different wavelengths (e.g., λ=479.2, 546.3, 632.8 or 745.3 nm). Concretely, the measured values are approximated by the Cauchy's formula (up to the 3rd term, Re=A+B/λ$^2$+C/λ$^4$) to determine the values A, B and C. In that manner, the data of Re and Rth at a wavelength of λ are replotted, from which Re(λ) and Rth(λ) at the wavelength λ may be thereby determined.

In this description, the "slow axis" of the retardation film and others means the direction in which the refractive index is the largest. The "visible light region" is from 380 nm to 780 nm. Unless otherwise specifically indicated in this description, the measurement wavelength is 550 nm.

In this description, it should be so interpreted that the numerical data, the numerical range and the qualitative expression (for example, expression of "equivalent", "equal" or the like) indicating the optical properties of the constitutive members such as the retardation region, the retardation film, the liquid-crystal layer and others shall be the numerical data, the numerical range and the qualitative properties including generally acceptable errors regarding the liquid-crystal display device and the constitutive members thereof.

In this description, a retardation film means a self-supporting film disposed between a liquid-crystal cell and a polarizing element (irrespective of the level of retardation). The retardation film is synonymous with a retardation layer. The retardation region is a generic term for one or more layers of a retardation film disposed between a liquid-crystal cell and a polarizing element.

In this description, the "front side" means the panel side; and the "rear side" means the backlight side. In this description, the "front" means the normal direction to the panel face; and the "front contrast ratio (CR)" means the contrast ratio computed from the white brightness and the black brightness measured in the normal direction to the panel face; and the "viewing angle contrast ratio (CR)" means the contrast ratio computed from the white brightness and the black brightness measured in the oblique directions inclined from the normal direction relative the panel face (for example, in the direction defined at an azimuth direction of 45 degrees and a polar angle direction of 60 degrees relative to the panel face).

The liquid-crystal display device of the invention is described hereinunder with reference to the drawing.

FIG. 1 is a schematic cross-sectional view of one example of the liquid-crystal display device of the invention. The liquid-crystal display device of FIG. 1 comprises a front-side polarizing element 20, a rear-side polarizing element 22, a liquid-crystal cell LC disposed between the front-side polarizing element 20 and the rear-side polarizing element 22, a front-side retardation region 16 composed of one or more retardation layers as disposed between the liquid-crystal cell LC and the front-side polarizing element 20, and a rear-side retardation region 18 composed of one or more retardation layers as disposed between the liquid-crystal cell LC and the rear-side polarizing element 22.

The liquid-crystal cell LC comprises a liquid-crystal layer 10 and a pair of a front-side substrate 12 and a rear-side substrate 16 between which the liquid-crystal layer is sandwiched. The front-side retardation region 16 and the rear-side retardation region 18 have retardation that contributes toward viewing angle compensation, or that is, the total of retardation along the thickness-direction of the front-side retardation region 16, Rth-front(λ) and retardation along the thickness-direction of the rear-side retardation region 18, Rth-rear(λ) is within a range capable of compensating Δnd(λ) in the black state of the liquid-crystal layer 10.

One characteristic feature of the invention is that Rth(λ) of the rear-side retardation region (18 in FIG. 1) is small.

Heretofore, as the backlight to be disposed on the rear side as the light source for a liquid-crystal display device, a backlight capable of emitting oriented light is used. The light from the backlight to a liquid-crystal display device in an oblique direction is scattered through the liquid-crystal layer in the liquid-crystal cell and the color filter, and the light component scattered in the front direction is one factor of reducing the front CR. As a result of investigations, the present inventor has found that, in case where the light from a backlight to a rear-side polarizing element passes through a retardation region before it comes in a liquid-crystal cell, the reduction in the front CR is remarkable. The reasons are as follows:

In case where the linear polarized light from a backlight having run through a rear-side polarizing element in an oblique direction passes through a retardation region before it enters a liquid-crystal cell, the light is elliptically polarized owing to Re(λ) and/or Rth(λ) in the retardation region and, after that, the light is scattered to the front through the liquid-crystal layer in the liquid-crystal cell and a color filter layer or the like. Of the light scattered on the front, the component in the absorption axis direction of the front-side polarizing element (hereinafter this may be referred to as "component A") is absorbed by the polarizing element, but the component in the transmission axis direction of the front-side polarizing element (hereinafter this may be referred to as "component B") runs through the polarizing element. The component B is the cause of reduction in the front CR. When the component B is reduced, then the front contrast ratio may be enhanced. From this viewpoint, Rth in the retardation region positioned between the rear-side polarizing element and the liquid-crystal cell is preferably as small as possible.

Based on the above findings, the inventor has further investigated and, as a result, found that the above-mentioned advantage is remarkable in a liquid-crystal display device employing a liquid-crystal cell, having a high-contrast ratio substrate as the front-side substrate (that is, the cell has no member to be a scattering factor, or even though having it, the cell still secures a high contrast ratio), and that in case where the contrast ratio of the front-side substrate is high (in case where the formulae (1) and (2) to be mentioned below are satisfied), the rear-side retardation region between the rear-side polarizing element and the liquid-crystal cell is made to satisfy the following formula (3):

$$25 \text{ nm} \leq Rth(550) \leq 90 \text{ nm}, \quad (3)$$

thereby providing a VA-mode liquid-crystal display device having a high front CR. On the basis of these findings, the inventor made the present invention. Specifically, according to the invention, satisfaction of the above formula (3) in the rear-side retardation region provides a VA-mode liquid-crystal display device that attains a high front contrast ratio.

Further, the liquid-crystal display device of an embodiment where the front-side retardation region between the front-side polarizing element and the liquid-crystal cell has predetermined optical properties attains increase in CR in oblique directions and reduction in color shift in the black state.

As described in the above, of the liquid-crystal cell that the liquid-crystal display device of the invention, the contrast ratio of the front-side substrate is high; and concretely, the liquid-crystal cell is as follows:

The ratio of the member contrast ratio of the front-side substrate (the member CR(front)) to the member contrast ratio of the rear-side substrate (the member CR(rear)), (the member CR(front)/the member CR(rear)) satisfies the following formula (1):

$$3.0 \leq \{\text{the member CR(front)/the member CR(rear)}\}, \quad (1)$$

and the total scattering intensity of the front-side substrate and all the members formed on the front-side substrate (hereinafter this may be referred to as "front-member scattering intensity") satisfies the following formula (2):

$$\text{The front-member scattering intensity} \leq 1/38000. \quad (2)$$

The above-mentioned member CR(front), the member CR(front 1) and the member CR(front 2), are the member contrast ratio of the front-side substrate each measured by the use of a commercially-available polarizing plate (for example, "HLC2-2518" by Sanritz), a high-retardation film and a low-retardation film, respectively. The above-mentioned member CR(rear) is the member contrast ratio of the rear-side substrate measured by the use of a commercially-available polarizing plate (for example, "HLC2-2518" by Sanritz).

In this description, the "member contrast ratio (member CR)" is meant to indicate the total contrast ratio of the substrate and all of the members formed on the substrate. Examples of the members include any members such as color filter, black matrix, array member (TFT array, etc.), projections on the substrate, common electrode, slits, etc.

The member contrast ratio of the rear-side substrate (member CR(rear)) and the member contrast ratio of the front-side substrate (member CR(front)) in the above formula (1) may be measured by the use of ordinary, commercially-available polarizing plates (for example, "HLC2-2518" by Sanritz). The concrete measurement method is as follows:

First, two substrates constituting a liquid-crystal cell, or that is, the front-side substrate and the rear-side substrate are separated. If desired, the separated faces are washed with water, ethanol or the like.

On a light source generally used in a liquid-crystal display device, a commercially-available polarizing plate (for example, "HLC2-2518" by Sanritz) is disposed; and the front-side substrate or the rear-side substrate is, as fitted to a rotary stage (for example, SGSP-120YAW, by Sigma Koki), disposed on it, in parallel thereto with a predetermined distance (for example, 2 mm) as spaced from the polarizing plate on the light source. In this, the array wiring and the black matrix on the rear-side substrate or the front-side substrate are made to correspond to the polarization axis of the polarizing plate. Further on it, a commercially-available polarizing plate (for example, "HLC2-2518" by Sanritz), as fitted to a rotary stage, is disposed in such a manner that the distance between the polarizing plates could be a predetermined distance (for example, 52 mm). Using an indicator (for example, TOPCON's BM5A) in a dark room, the brightness in the black and white states of display in the normal direction is measured; and the front contrast ratio A (white brightness/black brightness) is computed. The polarizing plate is rotated, and the lowest brightness is the brightness in the black state; and the polarizing plate is further rotated by 90 degrees, and the brightness in that direction is the brightness in the white state.

Next, in the above-mentioned embodiments, the color filter substrate or the array substrate is removed, and in this condition, the brightness in the black and white states of display of the polarizing plate alone is measured. From the data, the front contract B is computed.

To remove the influence of the front contrast ratio B of the polarizing plate on the front contrast ratio A, the member contrast ratio is computed according to the following formula:

The member $CR = 1/(1/\text{the front contrast ratio } A - 1/\text{the front contrast ratio } B)$.

Based on the computed data of the member CR, that ratio of the member contrast ratio of front-side substrate (member CR(front)) to the member contrast ratio of rear-side substrate (member CR(rear)), the member CR(front)/the member CR(rear), is computed.

The light source for use in the measurement is not specifically defined, and any one not having high directionality may be used. For example, a light source having a brightness in oblique directions (for example, in three directions at polar angle of 45 degrees and at an azimuth angle of 0 degree, 45 degree or 90 degrees) of 0.6 or so (for example, from 0.55 to 0.65), relative to the front brightness thereof of 1, may be used here. Ordinary light sources generally used as backlight in liquid-crystal display devices could satisfy the characteristics.

In the above formula (2), the front-member scattering intensity is the difference between the reciprocal of the contrast ratio of the front-side substrate and all the members formed on the front-side substrate, as measured by the use of a polarizing plate 2 of a combination of a high-retardation film and a polarizing element (the member CR(front 2)), and the reciprocal of the contrast ratio thereof, as measured by the use of a polarizing plate 1 of a combination of a low-retardation film and a polarizing element, (the member CR(front 1)); and this is computed according to the following formula:

The front-member scattering intensity={1/The member CR(front 2)}−{1/The member CR(front 1)}.

Regarding the high-retardation film and the low-retardation film used in the above-mentioned measurement, the former is a film having higher Rth and the latter is a film having lower Rth in a relative relationship therebetween. The same shall apply to Re, and preferably, the former has higher Re and the latter has lower Re relatively between them. Use of a film having same retardation as that of the retardation film actually used in liquid-crystal display devices is preferred as the practical significant difference can be reflected thereon; and from this viewpoint, use of a high-retardation film having Rth(550) of 210 nm and Re(550) of 60 nm and a low-retardation film having Rth(550) of 0 nm and Re(550) of 0 nm is preferred for the above-mentioned measurement. However, use of films of which Re and Rth differ from the above by ±10 nm or so could give the same result.

The concrete measurement method may be the same as the measurement method for the member CR(front). However, in place of the commercially-available polarizing plate, the polarizing plate 2 or 1 is used for the measurement.

Next, the front-side substrate is removed, and the brightness in the black or white state of display with the polarizing plate 2 or 1 alone is measured, and from the data measured with the polarizing plate 2 or 1, the front contrast ratio B is computed.

To remove the influence of the front contrast ratio B of the polarizing plate on the front contrast ratio A, the member contrast ratio (CR) is computed according to the following formula:

The member CR=1/(1/the front contrast ratio $A$−1/the front contrast ratio $B$).

In the manner as above, the member CR(front 2) and the member CR(front 1) are determined. Based on the data, the corresponding values are assigned to the following formula, and the front-member scattering intensity is computed.

The front-member scattering intensity={1/The member CR(front 2)}−{1/The member CR(front 1)}.

The front-member scattering intensity indicates the polarized light scattering degree in the front-side substrate; and the larger value means a larger scattering degree.

Mainstream liquid crystal cells have a color filter on the front-side substrate thereof, and none of liquid-crystal cell products having such a structure now available on the market satisfies the above formula (2). For satisfying the formula (2), the members of the front-side substrate must be processed for contrast ratio increase; and for example, in case where a color filter layer is disposed on the front-side substrate, for example, treatment for micropatterning of the black matrix, that for particle refining of pigment for use in the color filter and others would be necessary.

Assiduous investigations made by the present inventor has revealed that the effect of the invention is especially remarkable in an embodiment where the member contrast ratio of the front-side substrate (member CR(front)) in the VA-mode liquid-crystal cell is higher than the member contrast ratio of the rear-side substrate (member CR(rear)) therein and where the above-mentioned formulae (1) and (2) are satisfied. In this, as described above, when the VA-mode liquid-crystal cell (LC in FIG. 1) is disassembled into two substrates (substrates 12 and 14 in FIG. 1), the front-side substrate (substrate 12 in FIG. 1) and the members formed on the substrate are generically referred to as the front-side substrate; and the rear-side substrate (substrate 14 in FIG. 1) and the members formed on the substrate are generically referred to as the rear-side substrate. Examples of the members include color filter, black matrix, array member (TFT array, etc.), projections on the substrate, common electrode, slits, etc. Specifically, the member contrast ratio of the rear-side substrate of a liquid-crystal cell and that of the front-side substrate thereof each mean the total contrast ratio of the substrate and the members formed on the substrate. The measurement method is described above.

Assiduous investigations made by the present inventor has revealed that retardation of the rear-side retardation region between the rear-side polarizing element and the liquid-crystal cell has a significant influence on the front CR of a liquid-crystal display device. The reason is because optical phenomena such as scattering and diffraction occurring in the members of a liquid-crystal cell (for example, liquid-crystal layer, color filter, black matrix, array member, projections formed on the substrate, common electrode member, slit member, etc.) have polarization dependency. The details are described below.

In general, in a VA-mode liquid-crystal display device, the liquid-crystal layer is in a vertical alignment state in the black state, and therefore, the linear polarized light having passed through the rear-side polarizing element and running toward the normal direction at that time does not change its polarization state even after it has passed through the liquid-crystal layer, and in principle, the light is all absorbed by the absorption axis of the front-side polarizing element. Specifically, in principle, it may be said that there occurs no light leakage in the normal line direction in the black state. However, the front transmittance in the black state of the VA-mode liquid-crystal display device is not zero. It is known that one reason is because the liquid-crystal molecules in the liquid-crystal layer fluctuate, and the light having come into the liquid-crystal layer is scattered in some degree by the fluctuation. When the light having come into the liquid-crystal layer contains completely only the linear polarized component to be absorbed at the absorption axis of the front-side polarizing element, the influence may be greater and the light leakage on the front tends to increase. Specifically, when retardation in the retardation region disposed on the rear side is larger and when the incident light is elliptically polarized at a higher elliptical polarization degree, then the light leakage on the front owing to the fluctuation can be reduced more.

However, as a result of assiduous investigations, the present inventor has known that, except the fluctuation of the liquid-crystal molecules in the liquid-crystal layer, retardation in the retardation region between the rear-side polarizing element and the liquid-crystal layer also contributes to the reason for light leakage. When the oriented light from the backlight has passed through the rear-side polarizing element and comes in the retardation region in an oblique direction, the linear polarized light is converted into elliptical polarized light owing to retardation. The elliptically-polarized light is diffracted and scattered in the array member of the liquid-crystal cell and in the color filter layer, and at least a part of the light comes to run in the front direction. The elliptically polarized light includes a linear polarized light component that could not be blocked at the absorption axis of the front-side polarizing element, and therefore, even in the black state of display, there occurs light leakage in the front direction, therefore causing a reason for front CR reduction. The optical phenomena to occur through the array member and the color filter layer are, for example, because the surface of the array member and the color filter layer is not completely smooth but is roughened in some degree and because the member may contain some scattering factors, etc. The influence of the optical phenomena to occur through the array member and the color filter layer on the light leakage in the front direction is greater than the influence thereon of the fluctuation of the liquid-crystal molecules in the liquid-crystal layer mentioned above.

As a result of further investigations, the present inventor has known that the optical phenomena (diffraction, scattering, etc.) to occur when the light elliptically polarized through the retardation region passes through the predetermined members of the liquid-crystal cell bring about different influence modes on the light leakage in the front direction depending on as to whether the light passes through the member before coming into the liquid-crystal layer or the light passes through the member after having passed through the liquid-crystal layer. In FIG. 1, for example, when an array member is disposed on the inner face of the rear-side substrate 14 and a color filter is disposed on the inner face of the front-side substrate 12 as in FIG. 2(a), the incident light passes through the array member before coming into the liquid-crystal layer, and after having passed through the liquid-crystal layer, it runs through the color filter.

In the member through which the incident light passes before coming into the liquid-crystal layer (e.g., array member), the degree of elliptical polarization of the incident light is determined by retardation in the rear-side retardation region through which the light passes beforehand. On the other hand, in the member through which the incident light passes after having passed through the liquid-crystal layer (e.g., color filter), the degree of elliptical polarization of the incident light is determined by retardation of the liquid-crystal layer in addition to retardation in the rear-side retardation region. In the case of a VA-mode liquid-crystal display device, in general, $\Delta nd(550)$ of the liquid-crystal layer is defined to be from 280 to 350 nm or so. d means the thickness of the liquid-crystal layer (nm); $\Delta n(\lambda)$ means the refractivity anisotropy at a wavelength $\lambda$ of the liquid-crystal layer; and $\Delta nd(\lambda)$ is the product of $\Delta n(\lambda)$ and d. Even though retardation in the rear-side retardation region is so defined that the light leakage through the array member is reduced, the degree of elliptical polarization rather increases contrary to this, after the incident light has passed through the liquid crystal. When retardation in the rear-side retardation region is larger, then the degree of elliptical polarization of the incident light is smaller, and therefore, when retardation in the rear-side retardation region is set low, depending on the member through which the incident light passes before passing through the liquid-crystal layer or on the member through which the incident light passes after having passed through the liquid-crystal layer, the effect for the influence of the member on the light leakage in the front direction is turned back.

The level of retardation in the rear-side retardation region, the tendency of the influence of each member, through which the incident light passes, on the light leakage in the front direction, and the level of the influence are shown in FIG. 2(b). In FIG. 2(b), "↑" and "↓" mean the effects of elevating and decreasing the front CR respectively as compared with the case where the rear-side retardation region has a high retardation. The number of the arrows is a criterion of the level of the effect; and the larger number indicates a higher effect.

As in FIG. 2(b), in the embodiment of a VA-mode liquid-crystal display device where a color filter is disposed on the front-side substrate and an array member is on the rear-side substrate, when retardation in the rear-side retardation region is lowered, then the effect is toward the direction of reducing the light leakage in the front direction to be caused by the optical phenomenon by the array member disposed on the rear-side substrate, while on the other hand, the effect is toward the direction of increasing the light leakage in the front direction to be caused by the optical phenomenon by the color filter layer disposed on the front-side substrate, or that is, the two effects are in a relation of being canceled out each other.

For example, in a liquid-crystal cell where a member to be a factor of lowering the contrast ratio is disposed similarly on both the rear-side substrate and the front-side substrate, even though the rear-side retardation region has low retardation, the effect of elevating the front CR by the member disposed on the rear-side substrate (for example, in FIG. 2(b), the array member) may be somewhat canceled by the effect of reducing the front CR by the member disposed on the front-side substrate (for example, in FIG. 2(b), the CF member), as the case may be. Specifically, it may be said that the characteristic of the present invention that the rear-side retardation region has a low retardation exhibits an especially high effect in an embodiment where a lot of members to be factors of reducing the contrast ratio are disposed on the rear-side substrate.

The influence of retardation in the rear-side retardation region on the front CR is almost negligible in liquid-crystal display devices having a low front CR. However, in liquid-crystal display devices having a high front CR (for example, having a front CR of at least 1500) provided these days, the influence is not negligible for the purpose of further elevating the front CR. The invention is especially effective for further elevating the front CR of liquid-crystal display devices having a front CR of at least 1500.

Figure 2:
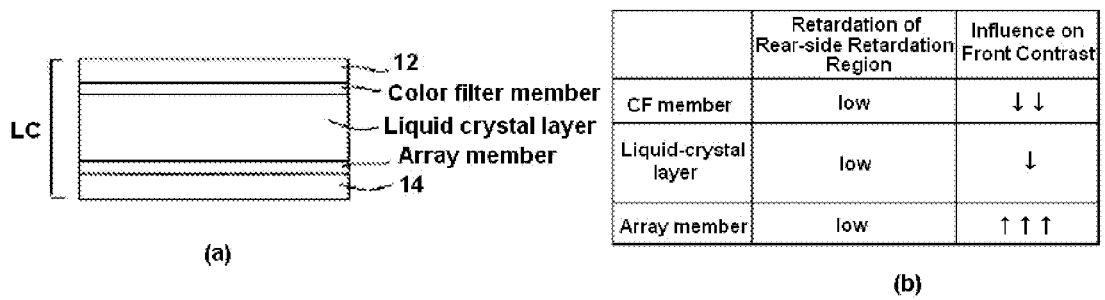
FIG. 2 is a schematic view used for explaining the effect of the invention.

In FIG. 2 showing one example of an ordinary liquid-crystal cell structure, a color filter (CF) is formed on the inner face of the front-side substrate 12 and an array member is on the inner face of the rear-side substrate 14. Apart from the ordinary liquid-crystal structure illustrated, CF and the array member may be positioned in any desired sites in the liquid-crystal display device of the invention. For example, needless-to-say, an embodiment where CF is disposed on the rear-side substrate having an array member thereon, like a color filter-on-array (COA) structure, falls in the scope of the invention. In case where the array member is disposed on the front-side substrate 12, the action of the array member may be the same as that of the CF member in FIG. 2(b); and in case where CF is disposed on the rear-side substrate 14, the action of the CF member may be the same as that of the array member in FIG. 2(b). The same shall apply to the other members not shown (for example, black matrix); and when the array member is disposed on the front-side substrate 12, then the action of the array member may be the same as that of the CF member in FIG. 2(b), and when the member is disposed on the rear-side substrate 14, then the action of the member may be the same as that of the array member in FIG. 2(b).

On the assumption that the polarized light running into a liquid-crystal cell could maintain its polarization state even after scattered by the inner members, the front CR improving effect of the invention could be described based on the trajectory of the polarized light on a Poincare sphere. On the other hand, heretofore, it is not considered that, when a polarized light is scattered, the light could keep the polarization state thereof; and therefore, the fact that the effect of the invention that has solved the problem of front CR reduction owing to light scattering inside a liquid-crystal cell could be described by the trajectory of a polarized light on a Poincare sphere may be unpredictable.

Not only the front CR but also the front color tone in the black state (front blackness) is an important display characteristic of a liquid-crystal display device. The present inventor's investigations have revealed that the liquid-crystal cell satisfying the above-mentioned formula (1) can reduce the color shift of the front blackness to a specific color. Retardation of the liquid-crystal layer, or that is, $\Delta nd(\lambda)$ has regular wavelength dispersion characteristics (meaning that retardation is smaller at a longer wavelength), and therefore, when an incident light passes through the liquid-crystal layer, the elliptical polarizability of the light in a short wavelength region becomes higher and, as a result, the light in a blue region tends to leak more. When the thickness of the liquid-crystal layer for every pixel (multi-gap) is changed, then the wavelength dispersion characteristics of $\Delta nd(\lambda)$ of the liquid-crystal layer may be thereby changed; however, in case where the value of $\Delta nd(\lambda)/\lambda$ is smaller at a longer wavelength, the light in a blue region tends to leak more as described in the above. In the liquid-crystal cell satisfying the formula (1), the influence of the wavelength dispersion characteristics of retardation of the liquid-crystal layer can be retarded, and the front color shift in the black state can be thereby reduced. This can also be described based on the trajectory of the polarized light on a Poincare sphere, on the assumption that the polarized light running into a liquid-crystal cell could maintain its polarization state even after scattered by the inner members.

Making the rear-side retardation region of the liquid-crystal cell satisfying the formulae (1) and (2) have a low retardation contributes toward improving not only the front CR but also the contrast ratio in oblique directions (hereinafter this may be referred to as "viewing angle CR"). For example, even though the liquid-crystal cell satisfying the formulae (1) and (2) is employed, but when the rear-side retardation region has a high retardation as in the conventional art, then the front CR and also the viewing angle CR could not be improved; however, in the invention, since the rear-side retardation region has a low retardation, satisfying the formula (3), and therefore, not only the front CR but also the viewing angle CR is improved.

This effect is differentiated from the viewing angle CR improving effect of the front-side retardation region to be mentioned below, which is to compensate the polarization axes of a pair of polarizing plates being shifted from perpendicular configuration.

Like the front CR improving effect thereof, the viewing angle CR improving effect of the invention can be described based on the trajectory of the polarized light on a Poincare sphere, on the assumption that the polarized light running into a liquid-crystal cell could maintain its polarization state even after scattered by the inner members.

The effect for front contrast ratio enhancement of the invention may be further augmented by controlling the angle profile of the outgoing light from backlight. Concretely, use of a backlight having a higher light-collecting ability increases the absolute value of the front contrast ratio, whereby the increase in the front CR absolute value indicating the effect of the invention is also increased. The light-collection index is represented by, for example, the ratio of the outgoing light intensity at the front, $I(0°)$ to the outgoing light intensity at a polar angle of 45 degrees, $I(45°)$, $I(0°)/I(45°)$; and the larger value indicates a backlight having a higher light-collecting ability. As the backlight having a high light-collecting ability, preferred is arrangement of a prism film having a light-collecting function (prism layer) between a diffusive film and a liquid-crystal panel. The prism film acts to collect the light that has been emitted through the light-emitting face of a light guide plate and has been diffused by a diffusive film, in the effective display area of a liquid-crystal panel with high efficiency. A liquid-crystal display device with an ordinary direct-lighting backlight built therein comprises, for example, a liquid-crystal panel comprising a transparent substrate, a color filter sandwiched between polarizing plates, and a liquid-crystal layer on the upper member thereof, and comprises a backlight disposed on the lower side. US 3M's trade name, Brightness Enhancement Film (BEF) is a typical example. BEF is a film comprising unit prisms each having a triangular cross section, as periodically disposed in one direction, in which the prism has a larger size (pitch) than the wavelength of light. BEF collects the "off-axis" light and redirects or recycles it "on-axis" toward viewers. There are known many patent publications such as JP-B 1-37801, JP-A 6-102506 and JP-T 10-506500 that disclose employment of such a brightness controlling member having a recurring array structure of prisms, such as typically BEF, in displays.

For enhancing the light-collecting ability, also preferred is use of a lens array sheet. The lens array sheet has a lens surface that comprises plural unit lenses formed to have a convex profile and disposed two-dimensionally at a predetermined pitch. A preferred embodiment of the lens array sheet is so designed that the side thereof opposite to the lens surface is a flat surface and a light-reflective layer to reflect light in the non-light-collecting region of the lens is formed on the flat surface. Also preferred is a lens array sheet that has a lenticular lens surface with plural convex-shaped cylindrical lenses disposed in parallel to each other at a predetermined pitch, wherein the side opposite to the lens surface is a flat surface and the flat surface has, as formed thereon, a light-reflective layer to reflect lengthwise-direction stripe light in the non-light-collection region of the convex-shaped cylindrical lenses. In addition, also usable are, for example, a lenticular lens array sheet where unit lenses each composed of a cylindrical curved surface are disposed in one direction in the surface thereof, and a lens array sheet where unit lenses each having a circular, rectangular, hexagonal or the like bottom shape and composed of a dome-like curved surface are two-dimensionally disposed in the surface thereof. These array sheets are described in JP-A 10-241434, 2001-201611, 2007-256575, 2006-106197, 2006-208930, 2007-213035, 2007-41172, etc., and these are incorporated herein by reference.

The invention is also effective in an embodiment of a display where the color reproduction region is enlarged by controlling the going-out light spectrum from the backlight and the transmission spectrum through the color filter. Concretely, as the backlight, preferably employed is a white backlight for which a red LED, a green LED and a blue LED are combined for color mixing. Also preferably, the half-value width of the peak of the light emitted by the red LED, the green LED and the blue LED is small. Of LED, the half-value wavelength width is 20 nm or so and is small as compared with that of CCFL; and when the peak wavelength of R (red) is 610 nm or more, that of G (green) is 530 nm and that of B (blue) is 480 nm or less, then the color purity of the light source itself can be increased.

It is reported that, except the peak wavelength of LED, when the spectral transmittance of a color filter is minimized as much as possible, then the color reproducibility can be further improved and the NTSC ratio can have a characteristic of 100%. For example, this is described in JP-A 2004-78102. In a red color filter, the transmittance at the peak position of green LED and blue LED is preferably small; in a green color filter, the transmittance at the peak position of blue LED and red LED is preferably small; and in a blue color filter, the transmittance at the peak position of red LED and green LED is preferably small. Concretely, the data of the transmittance are all at most 0.1, more preferably at most 0.03, even more preferably at most 0.01. Regarding the relationship between backlight and color filter, for example, a description is given in JP-A 2009-192661, which may be incorporated herein by reference.

Also preferred is use of a laser light source as the backlight for enlarging the color reproduction range. Preferably, the peak wavelength of the red, green and blue laser light sources is from 430 to 480 nm, from 520 to 550 nm, and from 620 to 660 nm, respectively. Regarding the laser light source serving as a backlight, a description is given in JP-A 2009-14892, which may be incorporated herein by reference.

As described in the above, it has been known that in an embodiment where the member contrast ratio of the rear-side substrate (14 in FIG. 1) and the front-side substrate (14 in FIG. 1) satisfies the above-mentioned formulae (1) and (2), the effect of the invention is remarkable. An example of the liquid-crystal cell satisfying the relationship is a liquid-crystal cell where the rear-side substrate is a COA substrate. Regarding COA, a detailed description is given in JP-A 2005-99499 and 2005-258004.

As described above, the incident light polarization state dependence of the light leakage in the black state owing to the optical phenomena at CF, black matrix, and array member every shows the same tendency; however, since the black matrix's contribution is relatively small, the position of the black matrix in a COA-structured liquid-crystal display device in which CF is positioned on the side of the rear-side substrate having an array member may be in any site inside the liquid-crystal cell, but is preferably between the rear-side polarizing element and the liquid-crystal layer. The black matrix may be substituted with a light-shielding layer for the TFT array. In any case, the effect of enhancing the front contrast ratio shown in the present patent can be attained.

Examples of the liquid-crystal cell satisfying the above-mentioned formulae (1) and (2) include a liquid-crystal cell not having a color filter, and a liquid-crystal cell not having a color filter but driven in a field-sequential display mode. The field-sequential mode liquid-crystal cell is described in detail in JP-A 2009-42446, 2007-322988, and Japanese Patent 3996178, which are incorporated herein by reference. In the field-sequential display mode, used are independent backlight units that sequentially emit lights of three primary colors. Preferred are backlight units each provided with LED as the light source; and for example, preferably used are backlight units each provided with an LED element emitting any of three colors of red, green and blue.

Even an ordinary liquid-crystal cell where an array member is disposed on the rear-side substrate and a color filter is on the front-side substrate can be a preferred embodiment of the invention needless-to-say satisfying the above-mentioned formulae (1) and (2), so far as the color filter therein has a high contrast ratio. One example of the color filter having a high contrast ratio is a color filter containing a pigment having a smaller particle size than that of the pigment to be used in ordinary CF. The following two methods may be mentioned as an example of producing a high-contrast ratio color filter with a pigment.

(i) A method of mechanically more finely grinding pigment particles by the use of a disperser such as a sand mill, a roll mill, a ball mill or the like, which is described, for example, in JP-A 2009-144126 and this may be incorporated herein by reference.

(ii) A method of dissolving a pigment in a solvent followed by reprecipitating it to prepare fine pigment particles, which is described, for example, in JP-A 2009-134178.

Except pigment, a method of producing a high-contrast ratio color filter with dye is proposed. It is described in detail in JP-A 2005-173532, which may be incorporated herein by reference.

Use of the contract-increased color filter may make an ordinary liquid-crystal cell satisfy the above-mentioned formulae (1) and (2).

Depending on the method for producing the color filter layer, the color filter layer may have a significant thickness-direction retardation Rth (this may be referred to as $Rth_{CF}$). In such a case, it may be good to take $Rth_{CF}$ of the color filter layer into consideration in determining Rth of the rear-side retardation region (this may be referred to as $Rth_{rear}$). Based on the optimum region of $Rth_{rear}$ at $Rth_{CF}=0$, $Rth_{rear}$ may be planned under the consideration that the optimum region of $Rth_{CF}$ will be toward the positive direction than the standard at $Rth_{CF}<0$, but will be toward the negative direction than the standard at $Rth_{CF}>0$.

It is presumed that a color filter layer would express $Rth_{CF}$ owing to alignment or packing of the molecules of the binder or the pigment that are the materials thereof, in the process of forming the color filter layer. $Rth_{CF}$ of the color filter layer, even though expressed, is extremely slight, and in general, it would be from −45 to 45 nm or so.

Again FIG. 1 is referred to. Preferably, the optical properties of the front-side retardation region 16 which the front-side polarizing plate PL2 has can contribute toward elevating the contrast ratio in oblique directions and reducing the color shift in the black state. $\Delta nd(\lambda)$ of the liquid-crystal layer in the VA-mode liquid-crystal cell LC is, as described above, generally from 280 to 350 nm or so. The preferred range of retardation, especially Rth of the front-side retardation region 18 varies depending on the value of $\Delta nd(\lambda)$ of the liquid-crystal layer. The preferred combination of the retardation films relative to $\Delta nd(\lambda)$ for elevating the oblique contrast ratio is described in various patent publications, for example, in Japanese Patents 3282986, 3666666 and 3556159, which may be incorporated herein by reference.

Preferred ranges of the optical properties of the front-side retardation region are described hereinunder.

$\Delta nd(550)$ of a VA-mode liquid-crystal cell is generally from 280 to 350 nm or so, and this is for increasing as much as possible the transmittance in the white state. On the other hand, when $\Delta nd(550)$ is less than 280 nm, the white brightness may decrease slightly along with the reduction in $\Delta nd(550)$, but since the cell thickness d is small, the liquid-crystal display device can be excellent in rapid responsibility. In case where the rear-side retardation region has a low retardation, then the light leakage in the front direction is reduced and, as a result, the characteristic feature of the invention of attaining a high front CR is effective in any liquid-crystal display devices having different $\Delta nd(550)$.

In the VA-mode liquid-crystal display device of FIG. 1, the rear-side retardation region 18 and the front-side retardation region 16 each are one layer; however, the invention is not limited to this embodiment. These regions may be composed of two or more retardation layers each. Preferably, the layers adjacent to the polarizing elements 22 and 26 each function as a protective film for the element. However, in an embodiment where a protective film for the polarizing element 22 is present between the polarizing element 22 and the liquid-crystal cell LC, the protective film is also a part or all of the rear-side retardation region, and it must satisfy the above-mentioned formula (3) as a whole or by itself.

In general, the rear-side polarizing element 22 has a protective film on the surface thereof facing the backlight 24, and may additionally have further thereon any functional film such as antifouling film, antireflection film, antiglare film, antistatic film, etc.; and similarly, the front-side polarizing element 20 generally has a protective film on the surface thereof facing the panel side, and may additionally have further thereon any functional film such as antifouling film, antireflection film, antiglare film, antistatic film, etc.

As described in the above, in the system for optical compensation where either one side is made to share a larger retardation, the film having a larger retardation is, in general, heretofore disposed on the rear side; however, as in the present invention, it is considered that arranging the film having a higher retardation on the front side could enhance the yield ratio of the polarizing plate. The reason is described below.

The film having a large retardation requires a step of stretching it at a high ratio; and therefore, as compared with inexpensive films capable of being produced with no necessity of many additives thereto (e.g., plane TAC, triacetyl cellulose film having Re of from 0 to 10 nm and Rth of from 30 to 80 nm) and films having a small retardation, the high-retardation film could hardly be broadened to have a large width. In ordinary liquid-crystal display devices, a landscape-oriented liquid-crystal cell is used, and in general, the absorption axis of the front-side polarizing element is disposed in the horizontal direction (right-left direction) while the absorption axis of the rear-side polarizing element is in the perpendicular direction (vertical direction). In industrial-scale production, in general, the polarizing element and the retardation film are stuck together in a roll-to-roll mode. Taking the matter into consideration that the polarizing plate produced according to the production method is stuck to the liquid-crystal cell, it is recommended to arrange a high-retardation film on the front side since the lateral direction of the polarizing plate can be used at a high efficiency, or that is, the yield ratio of the polarizing plate used can be increased. In case where a low-retardation film is disposed on the rear side as in the present invention, the film can be readily prepared as a wide film, and it can be combined with a wide polarizing element to further increase the production yield. As a result, an amount of the polarizing plate to be wasted may be reduced.

This is described with reference to concrete numerical data. In general, the width of a retardation film is 1100 mm, 1300 mm, 1500 mm, 2000 mm or 2500 mm; and the thickness of the film is about 25 μm, 40 μm or 80 μm. The length of the roll of the film is about 2500 m or 4000 m. On the other hand, regarding the panel size of a VA-mode liquid-crystal display device for application to TV, the panel size may be 20 inches, 32 inches, 40 inches, 42 inches, 52 inches or 68 inches. As one example, 42-inch panels most popularly released at present are discussed here. The 42-inch panel (standard 4:3) has a panel width of 853 mm (42-inch wide panel 16:9 has 930 mm), and a panel height of 640 mm (42-inch wide panel has 523 mm). In a conventional ordinary system where a high-retardation film is disposed on the rear side, only one retardation film for panel could be taken from a retardation film having, for example, a width of 1300 mm or 1500 mm in the width direction thereof. However, in the embodiment of the present invention, a high-retardation film is disposed on the front side, and therefore, even a retardation film having a width of, for example, 1300 mm or 1500 mm could be so cut that the height of the thus-cut film piece corresponding to the height of the panel size could be in the width direction of the retardation film, or that is, retardation films for two panels can be taken in the width direction, and the producibility may be doubled. The TV size is increasing year by year, and for example, a 65-inch (standard) TV has a panel width of 991 mm and a panel height of 1321 mm. In conventional ordinary rear-side arrangement in such a wide-view TV, even a wide-sized 2000-mm film could give only one retardation film for one panel in the width direction. Contrary to this, in the front-side arrangement as in the embodiment of the present invention, the film can give retardation films for two panels in the width direction. Further, a 68-inch (wide-view) TV has a panel width of 1505 mm and a panel height of 846 mm, for which about doubled producibility can be expected similarly.

The VA-mode liquid-crystal display device of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819.

Various members usable in the invention are described below.

1. Rear-Side Retardation Region

According to the invention, one or two or more retardation layers as a whole, which are disposed between the rear-side polarizing element and the VA-type liquid crystal cell, are called "rear-side retardation region". The rear-side retardation region satisfies following formula (3) as a whole.

$$25 \text{ nm} \leq Rth(550) \leq 90 \text{ nm}. \tag{3}$$

Preferably, the rear-side retardation region satisfies following formula (3') as a whole:

$$30 \text{ nm} \leq Rth(550) \leq 80 \text{ nm}; \tag{3'}$$

and more preferably, the rear-side retardation region satisfies following formula (3") as a whole:

$$30 \text{ nm} \leq Rth(550) \leq 70 \text{ nm}. \tag{3''}$$

Preferably, the rear-side retardation region satisfies following formula (4) as a whole:

$$|Re(550)| \leq 20 \text{ nm} \tag{4}$$

more preferably, the rear-side retardation region satisfies following formula (4') as a whole:

$$0 \text{ nm} \leq |Re(550)| \leq 15 \text{ nm}; \tag{4'}$$

and even more preferably, the rear-side retardation region satisfies following formula (4") as a whole:

$$0 \text{ nm} \leq |Re(550)| \leq 10 \text{ nm}. \tag{4''}$$

Rth of the rear-side retardation region preferably satisfies the following two formulas:

$$|Rth(450)|/|Rth(550)| \leq 1 \text{ and } 1 \leq |Rth(630)|/|Rth(550)|.$$

Namely, Rth of the rear-side retardation region preferably exhibits a higher value at a longer wavelength, that is, the reversed-dispersion characteristics, or is preferably constant with wavelength variation, in the visible light wavelength. The reversed-dispersion characteristics are more preferable.

The embodiment, wherein retardation of the rear-side retardation region exhibits the characteristics other than normal-dispersion characteristics, that is, retardation exhibits the reversed-dispersion characteristics or is constant with wavelength variation, is preferable in terms of reducing the front bluish tone in the black state, compared with the embodiment, wherein retardation of the rear-side retardation region exhibits the normal-dispersion characteristics.

For obtaining the higher front CR, internal haze of the retardation film(s) constituting the rear-side is preferably equal to or smaller than 0.5, more preferably equal to or smaller than 0.3, and even more preferably equal to or smaller than 0.2.

In this description, the film haze may be measured as follows: According to JIS K-6714, a film sample having a size of 40 mm×80 mm is prepared, and analyzed with a haze meter (NDH-2000, by Nippon Denshoku Industry) in an environment at 25 Celsius degrees and 60% RH, thereby measuring the haze of the film.

The rear-side retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-base polymer, a polyester-base polymer such as polyethylene terephthalate or polyethylene naphthalate, an acrylic-base polymer such as polymethylmethacrylate, or a styrene-base polymer such as polystyrene or an acrylonitrile-styrene copolymer (AS resin) may be used. Polyolefin such as polyethylene or polypropylene, a polyolefin-base polymer such as an ethylene-propylene copolymer, a vinyl chloride-base polymer, an amide-base polymer such as nylon or aromatic polyamide, an imido-base polymer, a sulfone-base polymer, a polyether sulfone-base polymer, polyetherether ketone-base polymer, a polyphenylensulfide-base polymer, a vinylidene chloride-base polymer, a vinyl alcohol-base polymer, a vinyl butyral-base polymer, an acrylate-base polymer, a polyoxymethylene-base polymer, an epoxy-base polymer, and a polymer containing a mixture of the above polymers, and are used as a major ingredient for preparing the retardation film constituting the rear-side retardation region satisfying the above-described properties.

As a retardation film satisfying the formulas (3) and (4) alone or a lamination of two or more films satisfying the formulas (3) and (4) as a whole, cellulose acylate-base, acryl-base polymer, and cycloolefin-base polymer films are preferable.

Cellulose Acylate-Base Film:

In the description, the term "cellulose acylate-base film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to ASTM の D-817-91.

Examples of the cellulose acylate(s) which can be used for preparing the retardation film constituting the rear-side retardation region include those described in JP-A 2006-184640, [0019]-[0025].

The substitution degree of the cellulose acylate which can be used as a material of the retardation film(s) constituting the retardation region is especially not limited, and is preferably from 2.30 to 3.00. The reversed-dispersion characteristics of the cellulose acylate-base film may be prepared by controlling the substitution degree or using any retardation enhancer, which is described in JP-A 2009-63983 or the like.

The cellulose acylate is preferably cellulose acetate, and may have any acyl group other than acetyl in place of acetyl or together with acetyl. Among these, cellulose acylates having at least one acyl selected from the group consisting of acetyl, propionyl and butyryl is preferable; and cellulose acylates having at least two selected from the group consisting of acetyl, propionyl and butyryl is more preferable. And cellulose acylates having acetyl and propionyl and/or butyryl are even more preferable; and the cellulose acylates having the substitution degree of acetyl of from 1.0 to 2.97 and the substitution degree of propionyl and/or butyryl of from 0.2 to 2.5 are even much more preferable.

The mass-averaged polymerization degree of the cellulose acylate to be used for preparing the retardation film constituting the rear-side retardation region is preferably from 200 to 800, and more preferably from 250 to 550. The number-averaged molecular weight of the cellulose acylate to be used for preparing the retardation film constituting the retardation region is preferably from 70000 to 230000, more preferably from 75000 to 230000, and even more preferably from 78000 to 120000.

For preparing the film satisfying the optical properties, which the rear-side retardation region is required to have, by itself or in combination with other film(s), any additive(s) may be used with the cellulose acylate. Examples of the additive which can be used include compounds for lowering optical anisotropy, agents for controlling wavelength-dispersion, UV inhibitors, plasticizers, degradation inhibitors, fine particles and agents for controlling optical properties. Examples of the additive which can be used in the invention include those described in JP-A 2006-184640, [0026]-[0218]. The preferred range of the additive is as same as that described in the publication. As well as the front-side retardation region, the rear-side retardation region may be added with the rod-like, discotic or positive birefringent compound as the additive.

The compound for lowering optical anisotropy may have any aryl group or may have no aryl group. The molecular weight of the compound for lowering optical anisotropy is preferably from 150 to 3000, more preferably from 170 to 2000, and especially preferably from 200 to 1000. Any monomers and any oligomers and polymers containing plural monomers, having the molecular weight falling within the above-described range, may be used.

Preferably, the compound for lowering optical anisotropy is liquid at 25 degrees Celsius, or solid having a melting point from 25 to 250 degrees Celsius; more preferably, the compound for lowering optical anisotropy is liquid at 25 degrees Celsius, or solid having a melting point from 25 to 200 degrees Celsius. And preferably the compound for lowering optical anisotropy is hardly evaporated during the step of casting or drying the dope.

An amount of the compound for lowering optical anisotropy is preferably from 0.01 to 30% by mass, more preferably from 1 to 25% by mass, especially preferably from 5 to 20% by mass with respect to the solid content of the cellulose acylate. Especially, according to the invention, at least one compound for lowering optical anisotropy is preferably added to the cellulose acylate having the degree of acyl-substitution of from 2.85 to 3.00 in an amount falling within the above-described range.

The compound for lowering optical anisotropy may be used alone or in combination with other(s) in any ratio. According to a solution casting method, the compound for lowering optical anisotropy may be added to a dope in any step during preparing the dope, and may be added to the dope in the final stage.

The cellulose acylate-base film to be used as a part of the rear-side retardation region or as the rear-side retardation region itself is preferably prepared according to a solution casting method. In this method, a solution (dope) which is prepared by dissolving cellulose acylate in an organic solvent is used for forming the film. When at least one additive is used, the additive may be added to a dope in any step during preparing the dope. Regarding the method for preparing the cellulose acylate-base films which can be used in the invention, the description in JP-A 2006-184640, [0219]-[0224] can be referred to.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a delivery valve (geeser) for casting, then peeled off from the support at an appropriate time, and then dried to form a film.

According to a solution successive-casting method, at first, a dope of the first layer is extruded from a delivery valve (geeser) for casting to be cast on a support; and, after being dried or not being dried, then a dope for the second layer is extruded from the delivery valve (geeser) for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

Acryl-Base Polymer Film:

The acryl-based polymer film which can be used in the invention is a film containing an acryl-based polymer having at least one repeating unit of (meth)acrylic acid ester as a major ingredient. Preferable examples of the acryl-based polymer include acryl-based polymers having at least one unit selected from the group consisting of lactone ring unit, maleic acid anhydride unit and glutaric anhydride together with at least one repeating unit of (meth)acrylic acid ester. Such acryl-base polymers are described in detail in JP-A 2008-231234 and 2008-9378, to which can be referred.

Various methods may be used for producing the film. For example, a solution casting method, melt-extrusion method, calendar method or condensing forming method may be used. Among these, a solution casting method and melt-extrusion method are preferable.

Examples of the solvent to be used in the solution casting method include chlorine-based solvents such as chloroform and dichloromethane; aromatic-based solvents such as toluene, xylene and benzene; alcohol-based solvents such as methanol, ethanol, isopropanol, n-butanol and 2-butanol; methylcellosolve, ethylcellosolve, butylcellosolve, butylcellosolve, dimethylformamide, dimethylsulfoxide, dioxane, cyclohexanone, tetrahydrofuran, acetone, methylethylketone, ethylacetate and diethylether. These solvents may be used alone or in combination with other(s).

The apparatus to be used in the solution casting method includes a drum-type casting machine, band-type casting machine and spin-coater.

As a melt-extrusion method, a T-die method and inflation method are exemplified. The temperature of the film forming is preferably from 150 to 350 degrees Celsius, and more preferably from 200 to 300 degrees Celsius.

The thickness of the retardation film constituting the rear-side region is preferably small. However, for reducing unevenness at the corner-side, it is necessary to reduce the deformation of the retardation film caused by external force to be applied to the film. The thickness of the retardation film disposed at the rear-side, constituting the rear-side retardation region is preferably equal to or more than 20 micro meters and equal to or less than 200 micro meters, in terms of reducing unevenness at the corner-side and improving the productivity.

2. Front-Side Retardation Region

The optical properties of the front-side retardation region, which is disposed between the front-side polarizing element and the liquid crystal cell, are preferably controlled to contribute to improving the contrast ratio in the oblique direction and reducing the color shift in the black state. One examples of the preferable front-side retardation region satisfies the following relations:

$$30 \text{ nm} \leq Re(550) \leq 90 \text{ nm, and } 170 \text{ nm} \leq Rth(550) \leq 300 \text{ nm.}$$

By using the front-side retardation region having the properties falling within the range, it is possible to reduce light leakages in oblique directions in the black state of a VA-mode liquid crystal cell (of which $\Delta nd(550)$ is from about 180 to about 350 nm).

Furthermore, the preferable range of retardation, especially Rth, of the front-side retardation region may vary depending on the value of $\Delta nd(\lambda)$ of the liquid crystal layer. Using $Rth_1(\lambda)$, which is Rth of the rear-side retardation region at a wavelength $\lambda$, $Rth_2(\lambda)$, which is Rth of the front-side retardation region at a wavelength $\lambda$, and $\Delta nd(\lambda)$ of the liquid crystal layer, one preferable example of the front-side region satisfies the following relation.

$$\Delta nd(550)-70 \leq Rth_1(550)+Rth_2(550) \leq \Delta nd(550)+10$$

One more preferable example of the front-side retardation region satisfies the following relation.

$$\Delta nd(550)-60 \leq Rth_1(550)+Rth_2(550) \leq \Delta nd(550)+20$$

By using the front-side retardation region having the properties falling within the range, it is possible to more reduce light leakages in oblique directions in the black state of a VA-mode liquid crystal cell. That is, it is possible to further improve the viewing angle CR.

As described above, for improving the transmittance in the white state, that is, improving the normal CR, $\Delta nd(550)$ of the liquid crystal layer is preferably equal to or more than 280 nm and equal to or less than 340 nm. In the embodiment, the front-side retardation region disposed at the front-side preferably satisfies the following relation:

$$220 \text{ nm} \leq Rth(550) \leq 280 \text{ nm; and more preferably satisfies the following relation:}$$

$$230 \text{ nm} \leq Rth(550) \leq 280 \text{ nm.}$$

On the other hand, considering the productivity, the embodiment employing a retardation film satisfying Rth $(550) \leq 230$ nm as the front-side retardation region may be preferable. Usually, for preparing a retardation film exhibiting high retardation, it is necessary to carry out a stretching treatment with a high stretching ratio, or to increase an amount of the additive capable of contributing to developing retardation. However, increasing the stretching ratio may make the film break more often, or increasing an amount of such an additive may make the additive exude from the film.

For using the retardation film satisfying Rth(550)≤230 nm as the front-side region, Δnd(550) of the liquid crystal cell preferably satisfies Δnd(550)≤290 nm, and more preferably satisfies Δnd(550) 280 nm.

Rth of the front-side retardation region preferably satisfies the following formulas:

|Rth(450)|/|Rth(550)|≤1 and 1≤|Rth(630)|/|Rth(550)|.

Rth of the front-side retardation region preferably exhibits a higher value at a longer wavelength, that is, the reversed-dispersion characteristics, or is preferably constant with wavelength variation, in the visible light wavelength. The reversed-dispersion characteristics are more preferable.

The embodiment, wherein retardation of the front-side retardation region exhibits the characteristics other than normal-dispersion characteristics, that is, retardation exhibits the reversed-dispersion characteristics or is constant with wavelength variation, is preferable in terms of improving the viewing angle CR, compared with the embodiment, wherein retardation of the rear-side retardation region exhibits the normal-dispersion characteristics.

The front-side retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-base polymer, a polyester-base polymer such as polyethylene terephthalate or polyethylene naphthalate, an acrylic-base polymer such as polymethylmethacrylate, or a styrene-base polymer such as polystyrene or an acrylonitrile-styrene copolymer (AS resin) may be used. Polyolefin such as polyethylene or polypropylene, a polyolefin-base polymer such as an ethylene-propylene copolymer, a vinyl chloride-base polymer, an amide-base polymer such as nylon or aromatic polyamide, an imido-base polymer, a sulfone-base polymer, a polyether sulfone-base polymer, polyetherether ketone-base polymer, a polyphenylensulfide-base polymer, a vinylidene chloride-base polymer, a vinyl alcohol-base polymer, a vinyl butyral-base polymer, an acrylate-base polymer, a polyoxymethylene-base polymer, an epoxy-base polymer, and a polymer containing a mixture of the above polymers, and are used as a major ingredient for preparing the retardation film constituting the front-side retardation region satisfying the above-described properties.

A cellulose acylate-base film is preferably used as a retardation film constituting the front-side retardation region. The cellulose acylate, which can be used as a material of the retardation film constituting the front-side retardation region, preferably has the degree of acyl-substitution of from 2.00 to 3.00. The reversed-dispersion characteristics of the cellulose acylate-base film may be prepared by controlling the substitution degree or using any retardation enhancer, which is described in JP-A 2009-63983 or the like.

The cellulose acylate is preferably cellulose acetate, and may have any acyl group other than acetyl in place of acetyl or together with acetyl. Among these, cellulose acylates having at least one acyl selected from the group consisting of acetyl, propionyl and butyryl is preferable; and cellulose acylates having at least two selected from the group consisting of acetyl, propionyl and butyryl is more preferable. And cellulose acylates having acetyl and propionyl and/or butyryl are even more preferable; and the cellulose acylates having the substitution degree of acetyl of from 1.0 to 2.97 and the substitution degree of propionyl and/or butyryl of from 0.2 to 2.5 are even much more preferable.

The mass-averaged polymerization degree of the cellulose acylate to be used for preparing the retardation film constituting the retardation region is preferably from 200 to 800, and more preferably from 250 to 550. The number-averaged molecular weight of the cellulose acylate to be used for preparing the retardation film constituting the retardation region is preferably from 70000 to 230000, more preferably from 75000 to 230000, and even more preferably from 78000 to 120000.

The cellulose acylate which can be used as a material of the retardation film constituting the front-side retardation region is same as the cellulose acylate which can be used as a material of the retardation film constituting the rear-side retardation region; however, the additive such as the compound for lowering optical anisotropy which can be used as a material of the retardation film constituting the rear-side retardation region is preferably not used in preparing the cellulose acylate-base film constituting the front-side retardation region. On the other hand, for preparing the cellulose acylate-base film constituting the front-side retardation region, retardation enhancer is preferably used as an additive. Examples of the retardation enhancer which can be used in the invention include rod-like or discotic compounds and positive-birefringence compounds. Examples of the rod-like or discotic compound include compounds having at least two aromatic rings, and are preferably used as a retardation enhancer. An amount of the rod-like compound is preferably from 0.1 to 30 parts by mass, and more preferably from 0.5 to 20 parts by mass with respect to 100 parts by mass of the polymer ingredients including cellulose acylate. An amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light range substantially.

(1) Discotic Compound

The discotic compound is described in detail. As the discotic compound, compounds having at least two aromatic rings may be used.

In the description, the term "aromatic ring" means not only an aromatic hydrocarbon ring but also an aromatic hetero ring. Examples of the discotic compound which can be used in the invention include those described in JP-A 2008-181105, [0038]-[0046].

Examples of the discotic compound which can be used as a material of the retardation film constituting the front-side retardation region include the compounds represented by formula (I) below.

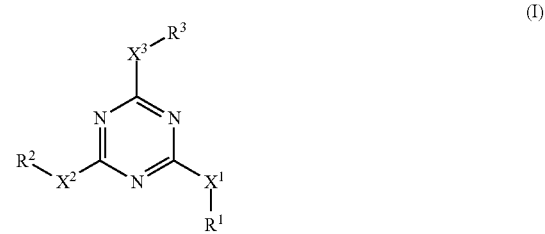

In the formula, $X^1$ represents a single bond, $-NR^4-$, $-O-$ or $-S-$; $X^2$ represents a single bond, $-NR^5-$, $-O-$ or $-S-$; $X^3$ represents a single bond, $-NR^6-$, $-O-$ or $-S-$. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

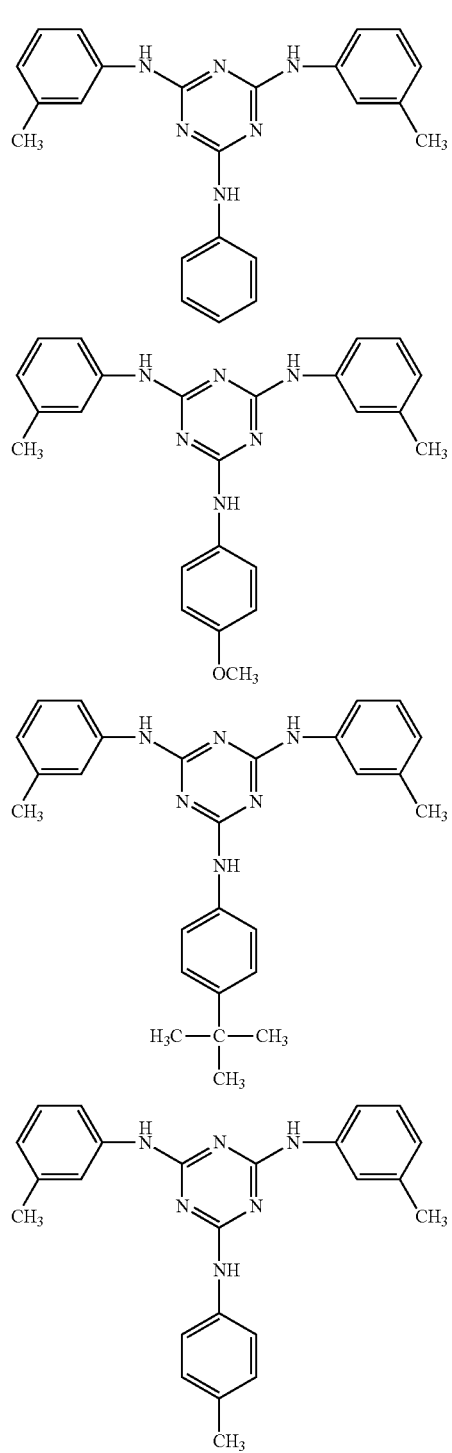

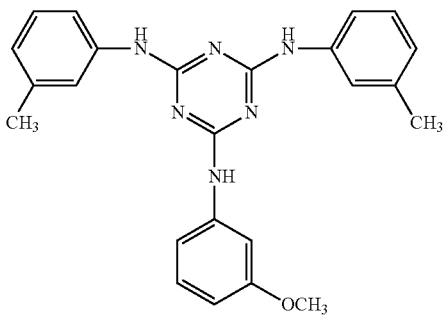

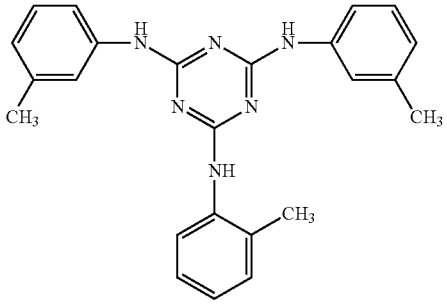

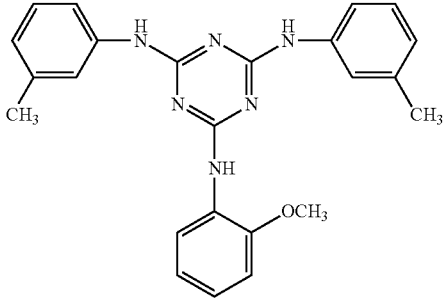

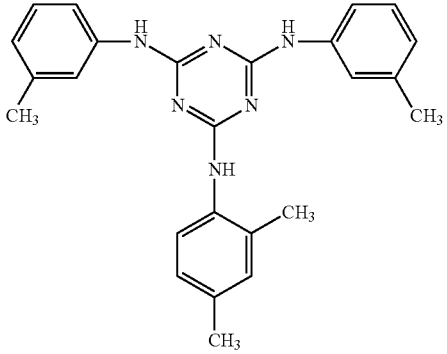

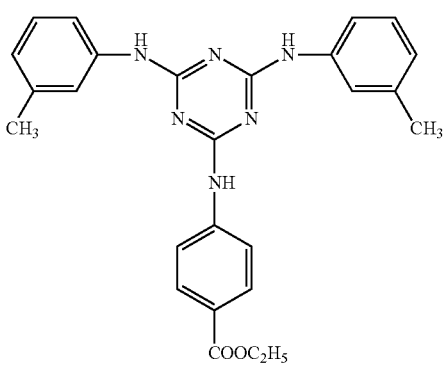

-continued
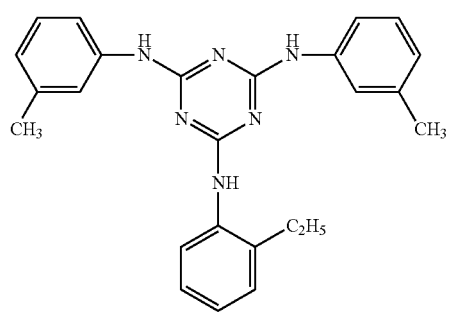
I-(10)
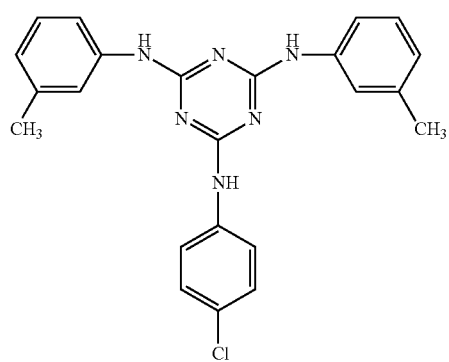
I-(11)
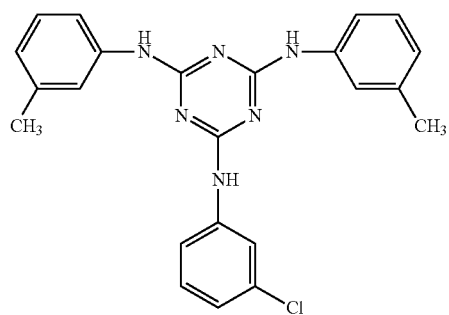
I-(12)
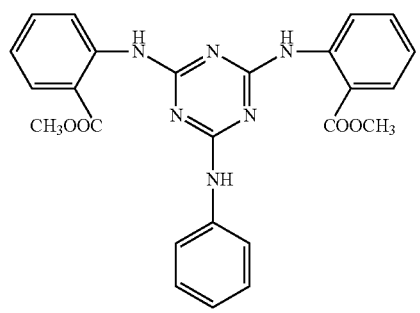
I-(13)
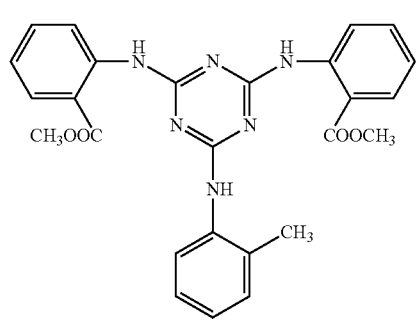
I-(14)
-continued
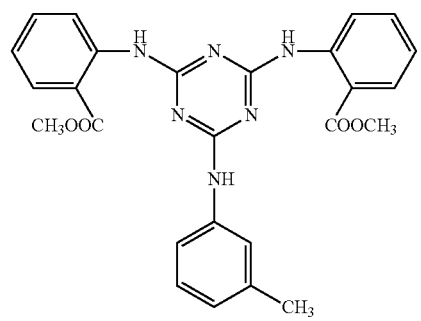
I-(15)
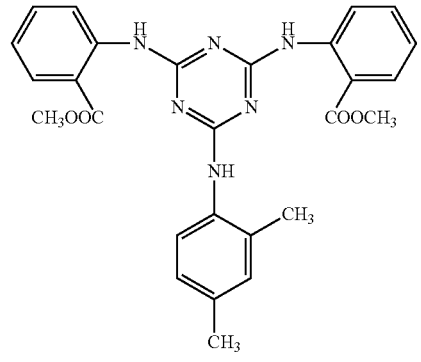
I-(16)
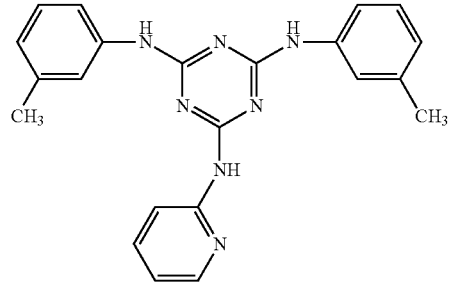
I-(17)
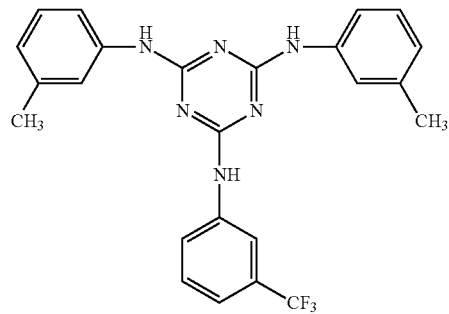
I-(18)
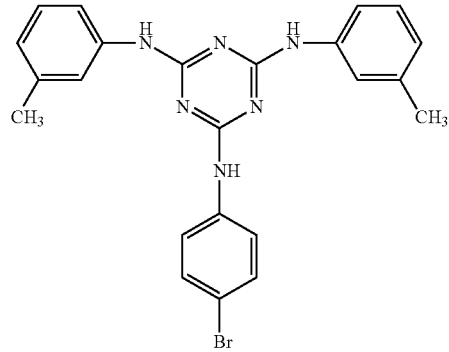
I-(19)

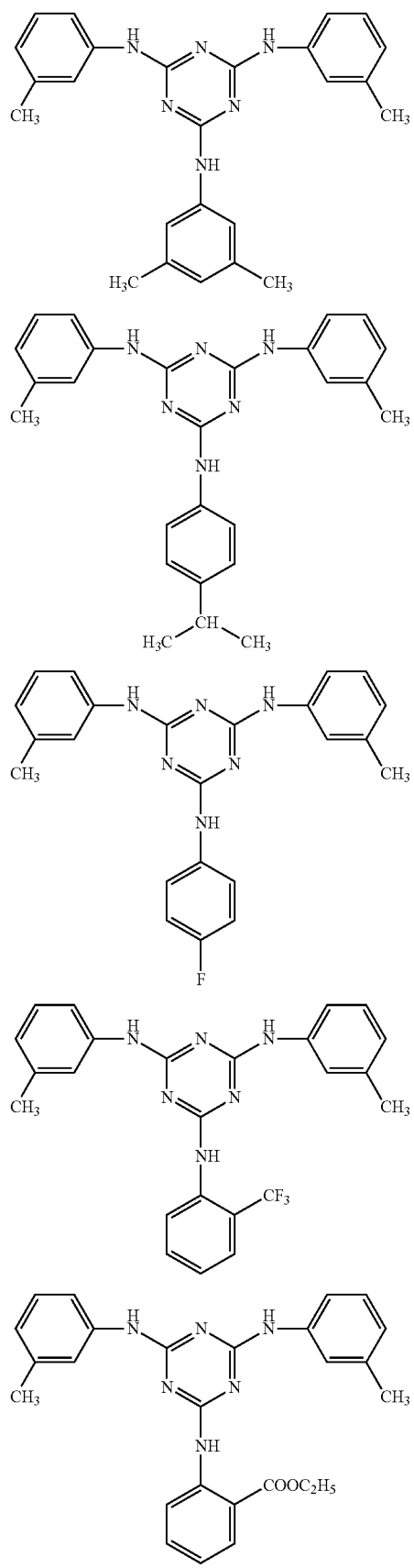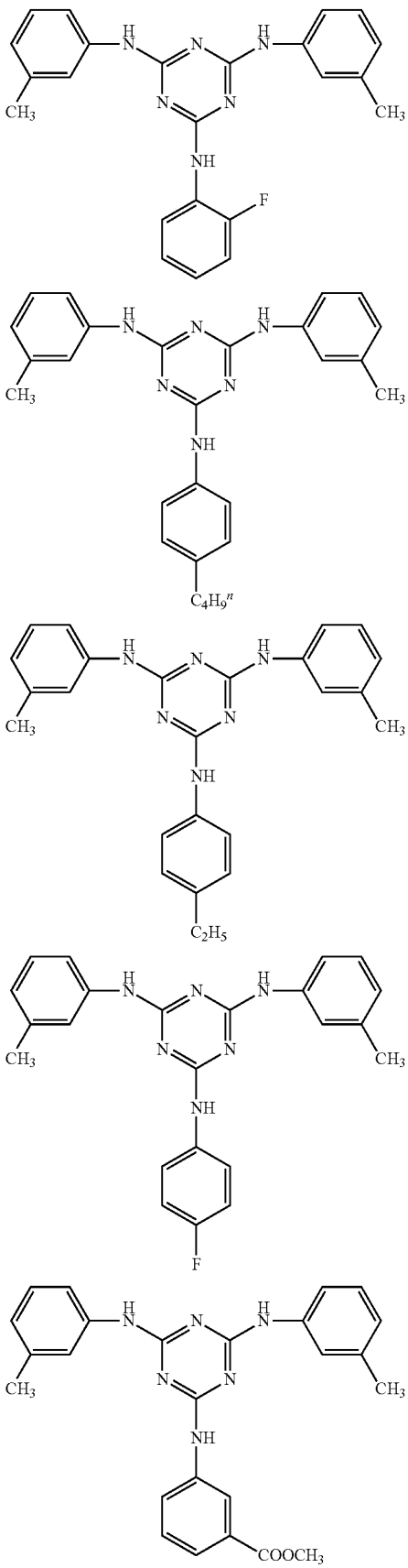

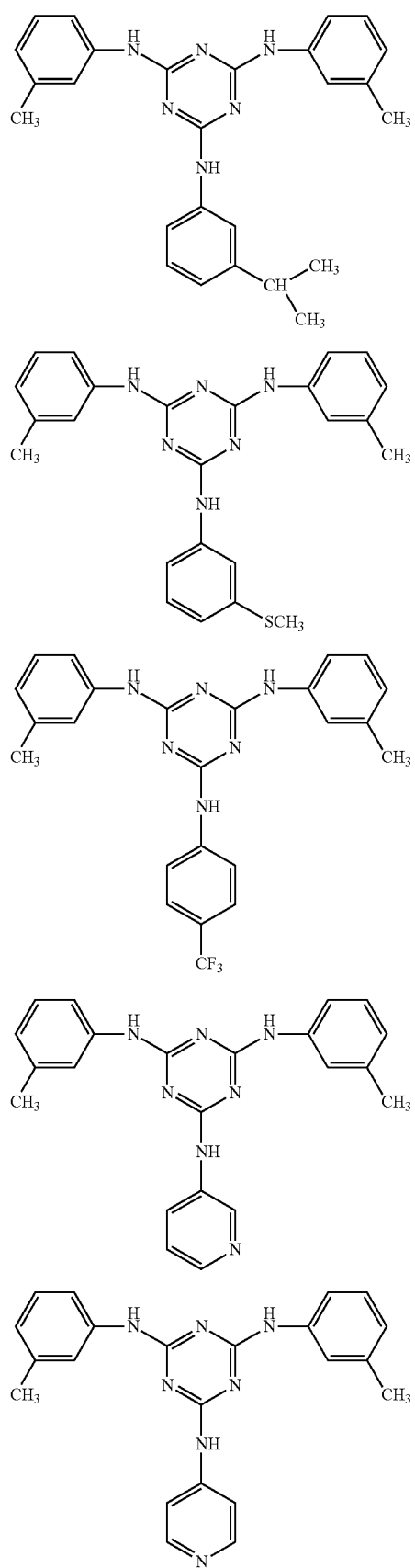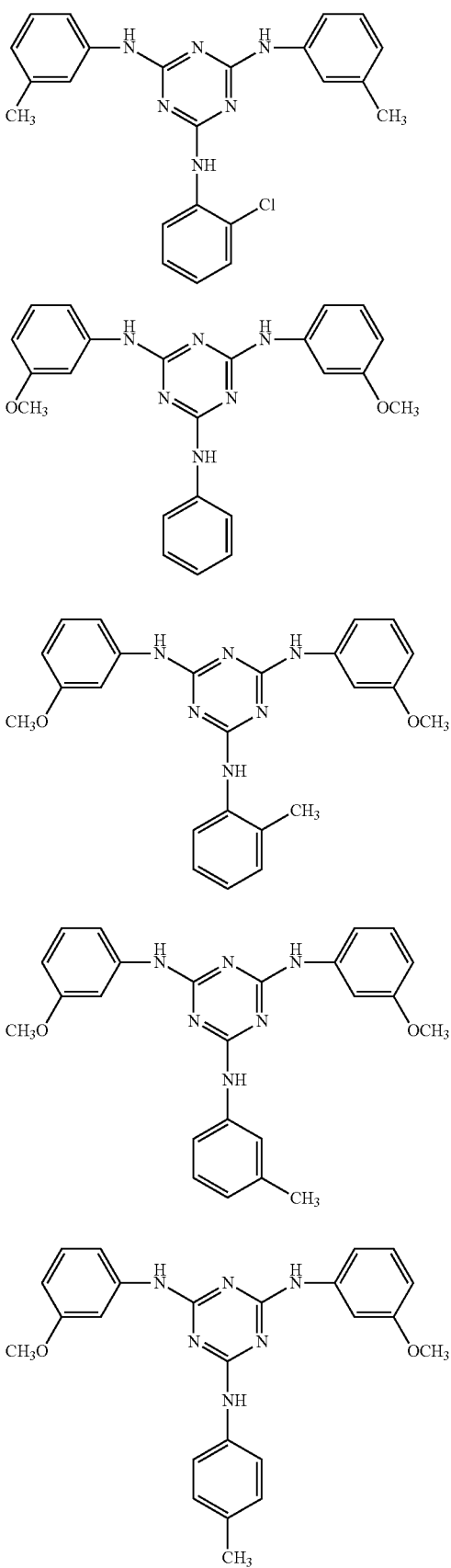

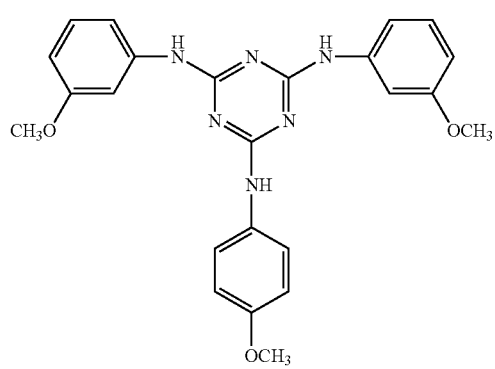
I-(40)
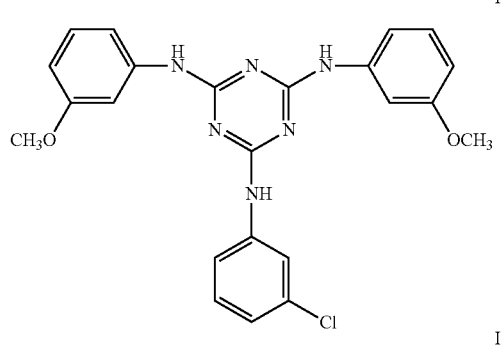
I-(41)
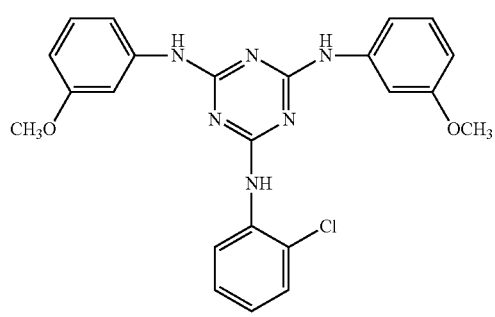
I-(42)
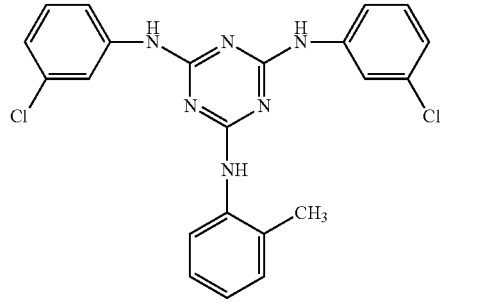
I-(43)
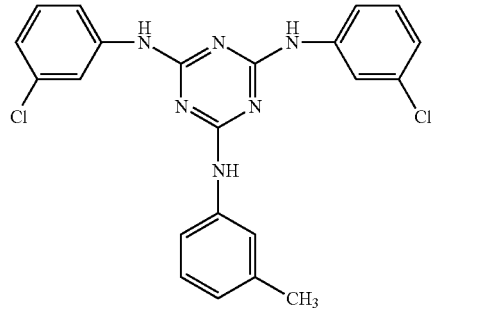
I-(44)
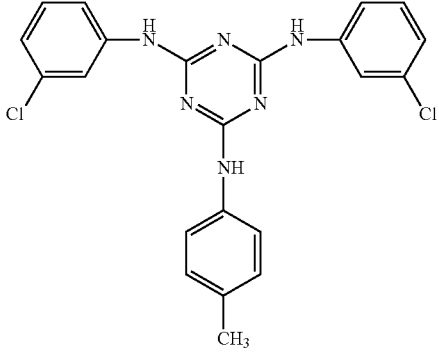
I-(45)
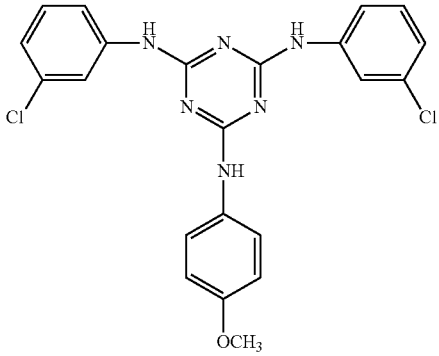
I-(46)
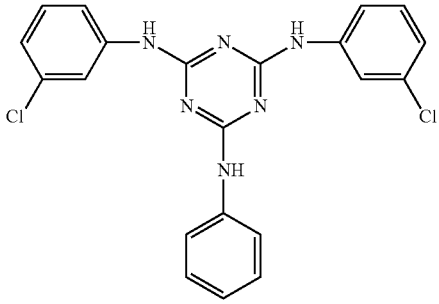
I-(47)
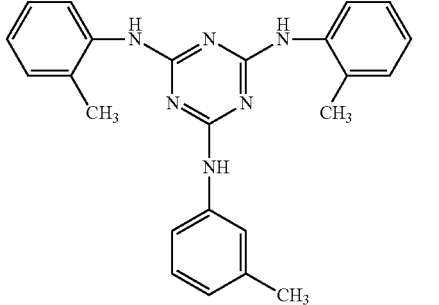
I-(48)
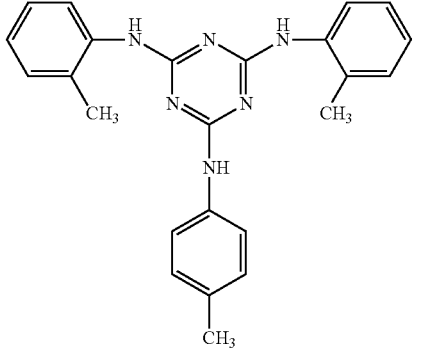
I-(49)

I-(50)
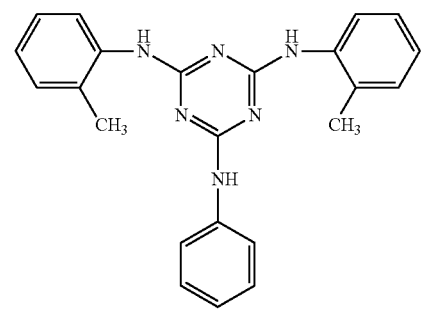
II-(1)
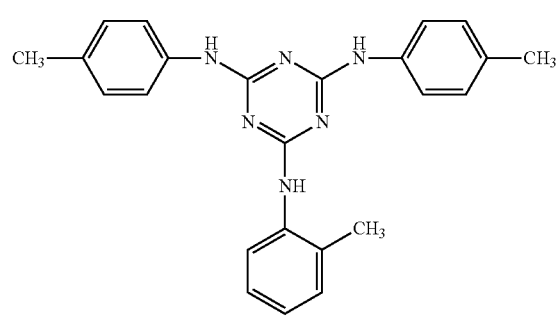
II-(2)
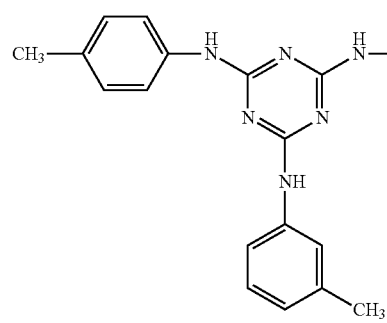
II-(3)
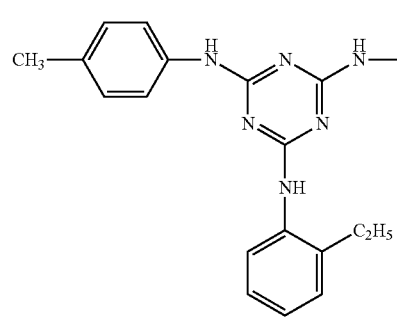
II-(4)
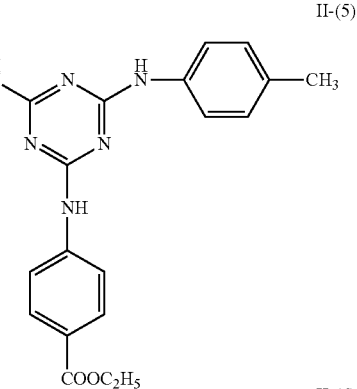
II-(5)
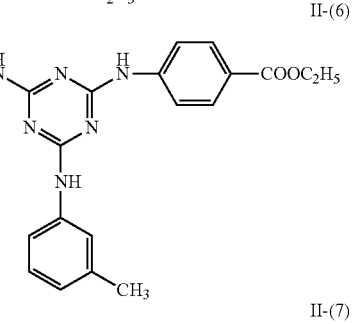
II-(6)
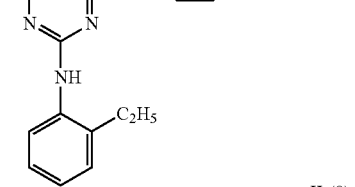
II-(7)
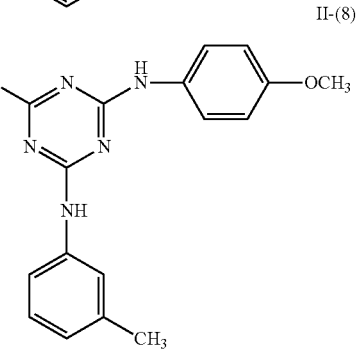
II-(8)
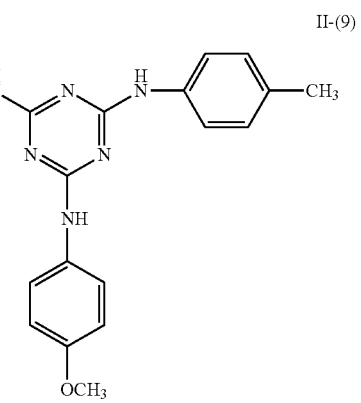
II-(9)

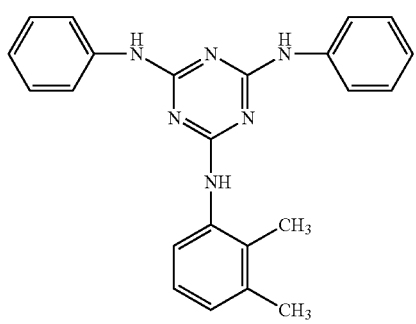
III-(1)
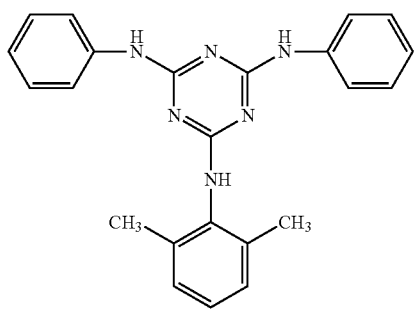
III-(2)
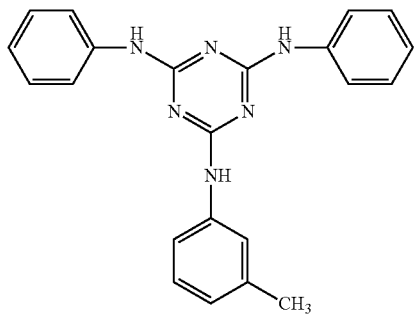
III-(3)
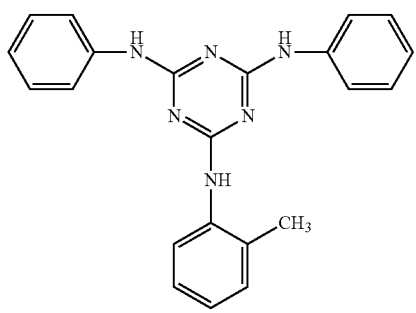
III-(4)
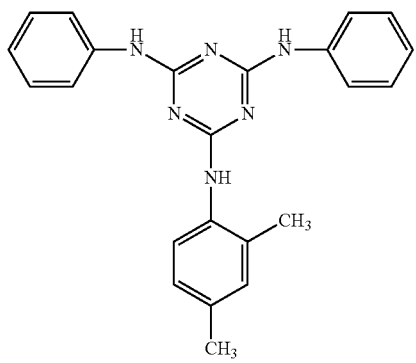
III-(5)
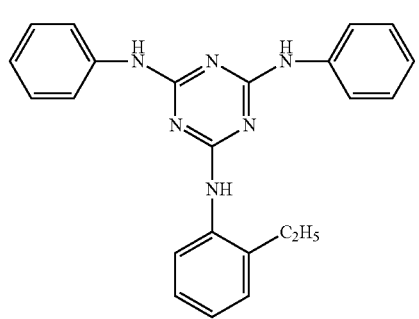
III-(6)
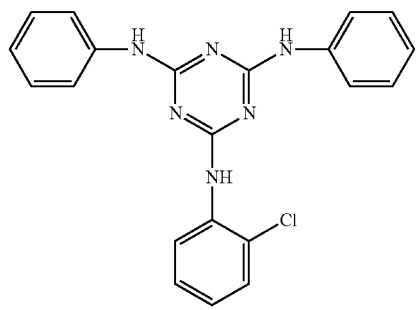
III-(7)
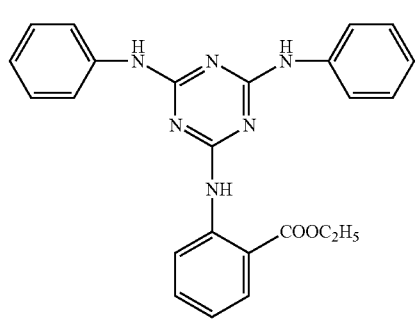
III-(8)
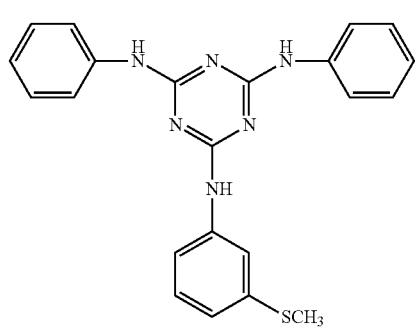
III-(9)
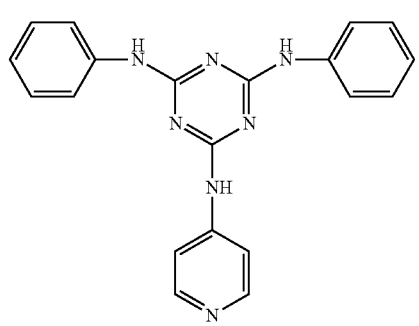
III-(10)

III-(11)
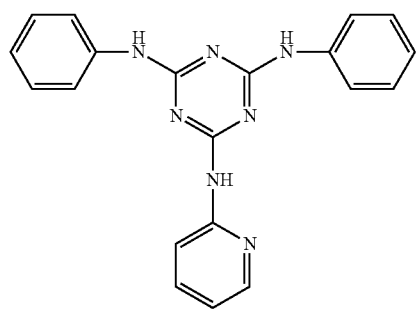
III-(12)
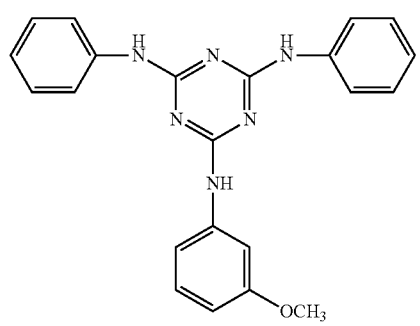
IV-(1)
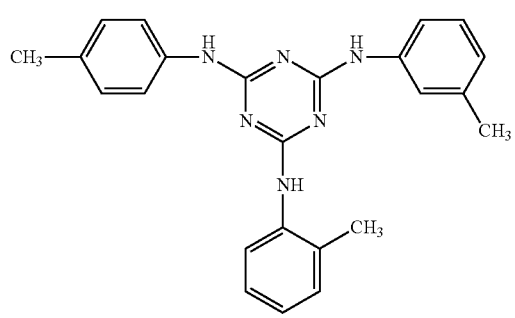
IV-(2)
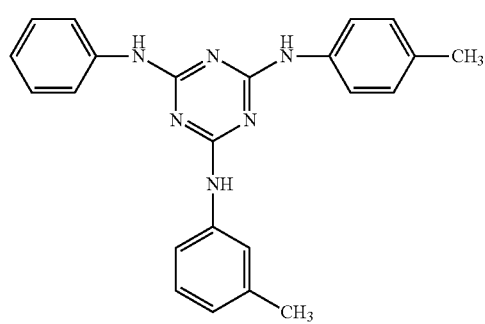
IV-(3)
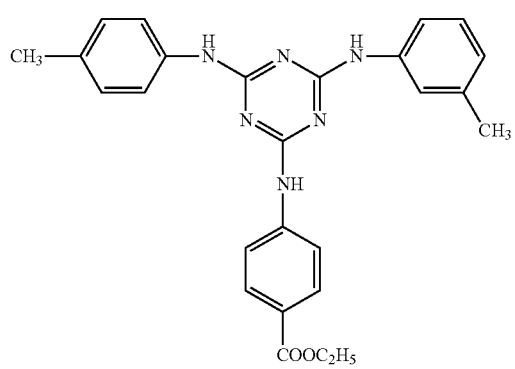
IV-(4)
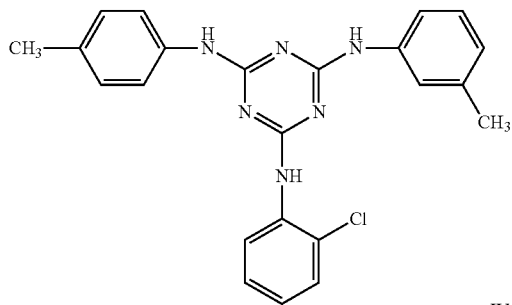
IV-(5)
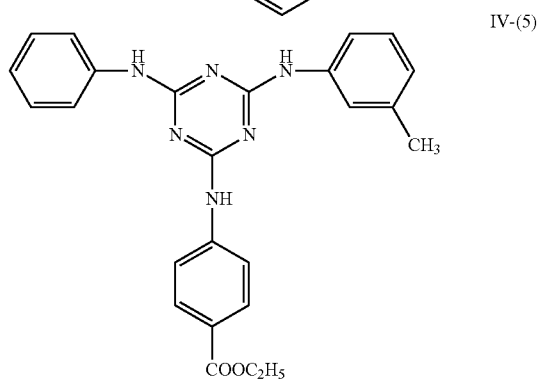
IV-(6)
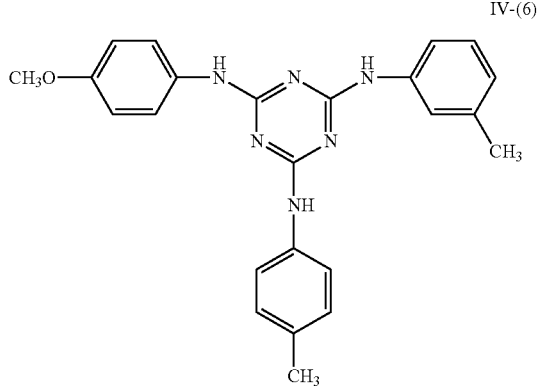
IV-(7)
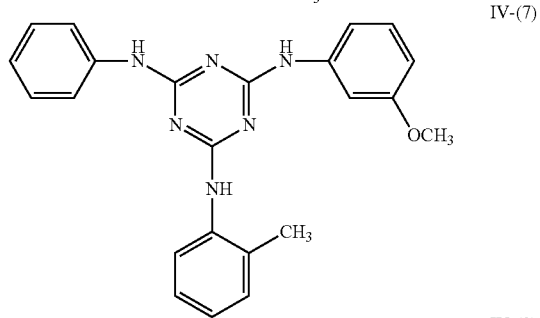
IV-(8)
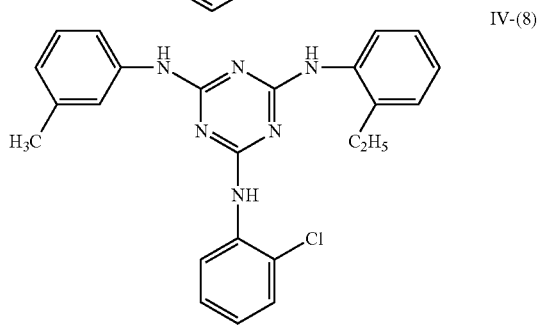

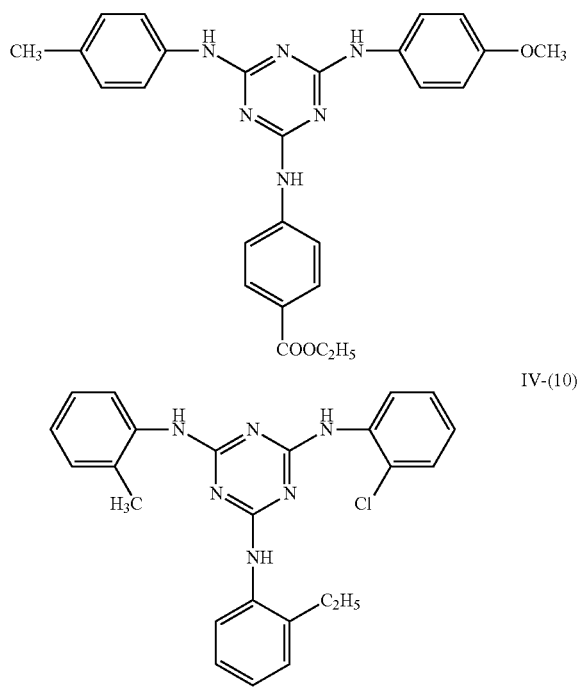

(2) Rod-Like Compound

In the invention, the rod-like compound, that is, the compound having a straight line-like molecular structure is preferably used other than the discotic compound. Examples of the rod-like compound which can be used in the invention include those described in JP-A 2007-268898, [0053]-[0095].

(3) Positive-Birefringent Compound

A positive-birefringent compound is a polymer as follows: a layer formed of monoaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherletones, polyamideimides and polyesterimides; polyetherketones and polyester-base polymers are preferable; and polyester-base polymers are more preferable.

The polyester-base polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-base polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphtharene dicarboxylic acid, 1,4-naphtharene dicarboxylic acid, 1,8-naphtharene dicarboxylic acid, 2,8-naphtharene dicarboxylic acid and 2,6-naphtharene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, isophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane diol, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups.

For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol: and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-30}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxylic acid or monoalcohol for blocking terminals, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 | — | SA | 100 | Ethane diol | acetyl ester residue | 1000 |
| P-40 | — | SA | 100 | Ethane diol | acetyl ester residue | 3000 |

-continued

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-41 | — | SA | 100 | Ethane diol | acetyl ester residue | 5500 |
| P42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

An amount of such the positive birefringent compound is preferably from 1 to 30 parts by mass, more preferably from 4 to 25 parts by mass and much more preferably from 10 to 20 parts by mass with respect to 100 part by mass of the cellulose acylate.

The cellulose acylate solution to be used for preparing the cellulose acylate-base film may be added with any additive other than the retardation enhancer. Examples of another additive include antioxidants, UV inhibitors, peeling promoters, plasticizers, agents for controlling wavelength-dispersion, fine particles and agents for controlling optical properties. They may be selected from any known additives.

The cellulose acylate solution for the rear-side or front-side retardation region may be added with any plasticizer in order to improve the mechanical properties of the prepared film or the drying rate. Examples of the plasticizer which can be used in the invention include those described in JP-A 2008-181105, [0067].

Any cycloolefin-base polymer film is preferably used as a retardation film constituting the front-side retardation region. Regarding the materials and methods employing the materials for preparing the cycloolefin-based polymer film, details are described in JP-A 2006-293342, [0098]-[0193], which can be referred to in the invention. Examples of the retardation film, constituting the front-side retardation region, include norbornene-base polymers such as ARTON (manufactured by JSR Corporation, and ZEONOR (manufactured by ZEON Corporation).

Various methods may be used for producing the retardation film constituting the front-side retardation region. For example, a solution casting method, melt-extrusion method, calendar method or condensing forming method may be used. Among these, a solution casting method and melt-extrusion method are preferable. And the retardation film constituting the front-side retardation region may be a film prepared by being subjected to a stretching treatment after forming. Stretching the film may be carried out according to a mono-axially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a delivery valve (geeser)

for casting, then peeled off from the support at an appropriate time, and then dried to form a film.

According to a solution successive-casting method, at first, a dope of the first layer is extruded from a delivery valve (geeser) for casting to be cast on a support; and, after being dried or not being dried, then a dope for the second layer is extruded from the delivery valve (geeser) for casting to be cast on the first layer. And if necessary, the three or more dopes are successively cast and laminated in this manner, then removed from the support at the appropriate time, and dried to form a film. According to a coating method, generally, a core layer is prepared according to a solution casting method. And then, a prepared coating liquid is applied to the surfaces of the core layer respectively or simultaneously by using an appropriate apparatus and dried to form a layered film.

The retardation film constituting the front-side retardation region may be a layer formed of a liquid crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the front-side retardation region include rod-like liquid crystals, discotic liquid crystals and cholesteric liquid crystals.

For achieving further higher front CR, the retardation film(s), disposed at the front-side, constituting the front-side retardation region, preferably has haze of equal to or smaller than 0.5, equal to or smaller than 0.3, and equal to or smaller than 0.2.

For reducing unevenness at the corner-side, it is necessary to reduce the deformation of the retardation film caused by external force to be applied to the film. The thickness of the retardation film disposed at the front-side, constituting the front-side retardation region is preferably equal to or more than 20 micro meters and equal to or less than 200 micro meters, in terms of reducing unevenness at the corner-side and improving the productivity.

3. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

4. Protective Film

To the both surfaces of the front-side or rear-side polarizing element, a protective film is preferably bonded. However, as shown in FIG. 1, in the embodiment, each of the rear-side and front-side retardation regions is formed of a single film, and the film also functions as a protective film, the liquid crystal cell-side protective film of the polarizing element may be omitted. According to the embodiment wherein the protective film and one or more retardation films are disposed between the rear-side polarizing element and the liquid crystal cell, the lamination of the protective film and the one or more retardation films is required to satisfy the optical properties as a whole which the rear-side retardation region is required to satisfy. The preferable materials of the protective film are same as those of the retardation film constituting the rear-side retardation region.

According to the embodiment wherein the protective film and one or more retardation films are disposed between the front-side polarizing element and the liquid crystal cell, the lamination of the protective film and the one or more retardation films as a whole preferably satisfy the optical properties which the front-side retardation region is required to satisfy. Being combined with one or more retardation films, the protective film may be a film contributing to improving the contrast ratio in the oblique direction and reducing the color shift in the black state, that is, a film exhibiting a certain degree of Re and Rth.

The protective film disposed on the outside of the front-side or rear-side polarizing element is especially not limited. Any polymer films may be used. Examples of the film are same as those which are exemplified above as examples of the retardation film constituting the rear-side retardation region. For example, films containing cellulose acylate (e.g., cellulose acetate, cellulose propionate and cellulose butyrate), polyolefin (e.g., norbornene-based polymer, and polypropylene), poly(meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-based polymer film, ARTON (manufactured by JSR) and ZEONOR (manufactured by NIPPON ZEON)) can be also used.

EXAMPLES

The invention is described in more detail with reference to the following Examples. In the following Examples, an amount of the material, reagent and substance used, their ratio, the operation with them and the like may be suitably modified or changed not overstepping the sprit and the scope of the invention. Accordingly, the scope of the invention should not be limited to the following Examples.

1. Production Methods for Films:
(1) Preparation of Film 1:

A commercially-available cellulose acylate film, "Fujitac TD80UL" (trade name by FUJIFILM) was prepared, and this was used as Film 1.

(2) Preparation of Film 2:

A commercially-available norbornene polymer film, ZEONOR ZF14-100 (by Optes) was stretched at a temperature of 153 degrees Celsius in a mode of edge-fixed biaxial stretching in MD by 1.5 times and in TD by 1.5 times, and then its surface was subjected to a corona discharge treatment. This was used as film 2. The thickness of the film was 45 μm.

(3) Preparation of Film 3:

Film 3 having a thickness of 34 μm was produced according to the same method as that for the film sample 201 in JP-A 2009-63983.

(4) Preparation of Film 4:
(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (3) | 8.5 mas. pts. |
| Methylene chloride | 365.5 mas. pts. |
| Methanol | 54.6 mas. pts. |

The composition of the retardation enhancer (3) is shown in Table below. In the table, EG means ethylene glycol, PG means propylene glycol, BG means butylene glycol, TPA means terephthalic acid, PA means phthalic acid, AA means adipic acid, SA means succinic acid. The retardation enhancer (3) is a non-phosphate compound, and is a compound functioning as a retardation enhancer. The terminal of the retardation enhancer (3) is blocked with an acetyl group.

| Retardation enhancer | Glycol unit | | | Dicarboxylic acid unit | | | Molecular weight |
|---|---|---|---|---|---|---|---|
| | Ratio of blocking both terminal hydroxyls(%) | EG (%) | PG (%) | Averaged number of carbon atoms | TPA (mole %) | SA (mole %) | Averaged number of carbon atoms | |
| (3) | 100 | 50 | 50 | 2.5 | 55 | 45 | 6.2 | 730 |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (3) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 38 μm from the cellulose acylate solution for low-substitution layer and to form a skin layer A and a skin layer B each having a thickness of 2 μm from the cellulose acylate solution for high-substitution layer. The formed film was peeled away from the band, dried at a temperature of 200 degrees Celsius for 30 minutes while the residual solvent amount was 20% relative to the total mass of the film, and then further dried at 130 degrees Celsius for 20 minutes. This was used as Film 4.

(5) Preparation of Film 5:

A commercially-available cellulose acylate-base film, "Z-TAC" (trade name by FUJIFILM) was prepared, and this was used as Film 5.

(6) Preparation of Film 6:

A cellulose acylate was prepared, of which the type of the acyl group and the degree of substitution are shown in the following Table. Concretely, a catalyst, sulfuric acid (in an amount of 7.8 parts by mass relative to 100 parts by mass of cellulose) was added to cellulose, and then a carboxylic acid to give the acyl group was added thereto, and the cellulose was acylated at 40 degrees Celsius. In this, the type and an amount of the carboxylic acid were changed to thereby change and control the type of the acyl group and the degree of substitution with the acyl group. After the acylation, the product was aged at 40 degrees Celsius. The low-molecular component was removed from the cellulose acylate by washing with acetone. In the Table, Ac means an acetyl group, and CTA means cellulose triacetate (cellulose ester derivative in which the acyl groups are all acetate groups).

(Cellulose Acylate Solution)

The following composition was put into a mixing tank and stirred to dissolve the ingredients. After heated at 90 degrees Celsius for about 10 minutes, this was filtered through a paper filter having a mean pore size of 34 μm and a sintered metal filter having a mean pore size of 10 μm.

| Cellulose Acylate Solution | |
|---|---|
| CTA in Table below | 100.0 mas. pts. |
| Triphenyl phosphate (TPP) | 7.8 mas. pts. |
| Biphenyldiphenyl phosphate (BDP) | 3.9 mas. pts. |
| Methylene chloride | 403.0 mas. pts. |
| Methanol | 60.2 mas. pts. |

(Mat Agent Dispersion)

The following composition containing the cellulose acylate solution that had been prepared according to the above method was put into a disperser and dispersed to prepare a mat agent dispersion.

| Mat Agent Dispersion | |
|---|---|
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(Additive Solution)

The following composition containing the cellulose acylate solution that had been prepared according to the above method was put into a mixing tank and dissolved by stirring under heat to prepare an additive solution.

| Additive Solution | |
|---|---|
| Retardation enhancer (1) | 20.0 mas. pts. |
| Methylene chloride | 58.3 mas. pts. |
| Methanol | 8.7 mas. pts. |
| Cellulose acylate solution | 12.8 mas. pts. |

100 parts by mass of the cellulose acylate solution, 1.35 parts by mass of the mat agent dispersion, and the additive solution in such an amount that an amount of the retardation enhancer (1) in the cellulose acylate film to be formed could be 10 parts by mass were mixed to prepare a dope for film formation. An amount of the additive is by mass relative to 100 parts by mass of an amount of the cellulose acylate.

The abbreviations of the additive and the plasticizer in the following Table are as follows:

CTA: triacetyl cellulose

TPP: triphenyl phosphate

BDP: biphenyldiphenyl phosphate

Retardation Enhancer (1):

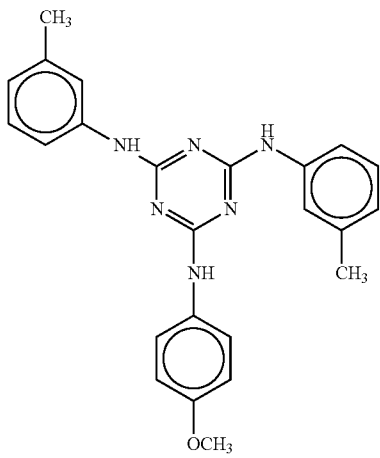

Using a band caster, the above dope was cast. The film having a residual solvent amount shown in the following Table was peeled away from the band, and in the section from the peeling to the tenter, this was stretched in the machine direction at the draw ratio shown in the following Table, and then, using a tenter, stretched in the cross direction at the draw ratio shown in the following Table. Immediately after the cross stretching, the film was shrunk (relaxed) in the cross direction at the ratio shown in the following Table, and then the film was removed from the tenter. The process gave a cellulose acylate film. The residual solvent amount in the film removed from the tenter was as in the following Table. Both edges of the film were trimmed away before the winding zone to make the film have a width of 2000 mm, and the film was wound up into a roll film having a length of 4000 m. The draw ratio in stretching is shown in the following Table.

|  | Cellulose acylate film | Film 6 |
|---|---|---|
| Cellulose acylate | Cellulose Type | CTA |
|  | Total degree of substitution | 2.81 |
|  | Ratio of 6-positon substitution | 0.316 |
|  | Degree of 6-position substitution | 0.907 |
|  | Substituent | Ac |
| Additive | Additive type | Retardation enhancer (1) |
|  | Amount [parts by mass relative to 100 parts by mass of cellulose] | 1.4 |
| Plasticizer | Plasticizer type | TPP/BDP |
|  | Amount [parts by mass relative to 100 parts by mass of cellulose] | 7.8/3.9 |
| Stretching condition | Ratio of longwise stretching [%] | 1 |
|  | Ratio of cross stretching [%] | 5 |
|  | Ratio of shrinking [%] | 1 |
|  | Stretching speed [%/min] | 70 |
|  | Film surface temperature [° C.] | 120 |
| Amount of residual solvent at the time of peeling off [%] | | 75 |
| Amount of residual solvent at the time of termination of stretching [%] | | 20 |

Thus produced, the cellulose acylate film was used as Film 6.

(7) Preparation of Film 7:

A cellulose acylate film was produced in the same manner as that for Film 6, for which, however, an amount of the retardation enhancer (1) to be added was changed from 1.4 parts by mass to 1.5 parts by mass. The film was used as Film 7.

(8) Preparation of Film 8:

(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 19.0 mas. pts. |
| Methylene chloride | 367.1 mas. pts. |
| Methanol | 54.8 mas. pts. |

The composition of the retardation enhancer (2) is shown in Table below. In the table, EG means ethylene glycol, PG means propylene glycol, BG means butylene glycol, TPA means terephthalic acid, PA means phthalic acid, AA means adipic acid, SA means succinic acid. The retardation enhancer (2) is a non-phosphate compound, and is a compound functioning as a retardation enhancer. The terminal of the retardation enhancer (2) is blocked with an acetyl group.

| | | Glycol unit | | | Dicarboxylic acid unit | | | |
|---|---|---|---|---|---|---|---|---|
| Retardation enhancer | Ratio of blocking both terminal hydroxyls(%) | EG (%) | PG (%) | Averaged number of carbon atoms | TPA (mole %) | SA (mole %) | Averaged number of carbon atoms | Molecular weight |
| (2) | 100 | 50 | 50 | 2.5 | 55 | 45 | 6.2 | 730 |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 19.0 mas. pts. |
| Silica particles having a mean particle size of 16 nm (Aerosil R972, by Nippon Aerosil) | 0.15 mas. pts. |
| Methylene chloride | 422.0 mas. pts. |
| Methanol | 63.0 mas. pts. |

(Production of Cellulose Acylate Sample)

The two cellulose acylate solutions were cast onto a band to form thereon a core layer having a thickness of 52 μm from the cellulose acylate solution for low-substitution layer and to form a skin layer A and a skin layer B each having a thickness of 2 μm from the cellulose acylate solution for high-substitution layer. The formed film was peeled away from the band, clipped, and stretched in the transverse direction by 8% at a stretching temperature of 140 degrees Celsius while the residual solvent amount was 20% relative to the total mass of the film, using a tenter. Next, the film was unclipped, dried at 130 degrees Celsius for 20 minutes and stretched in the transverse direction by 24% at a stretching temperature of 176 degrees Celsius by using a tenter. In this way, a film having a thickness of 56 μm was prepared. This was used as Film 8.

(8) Preparation of Film 9:
(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 17.0 mas. pts. |
| Methylene chloride | 361.8 mas. pts. |
| Methanol | 54.1 mas. pts. |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 114 μm from the cellulose acylate solution for low-substitution layer and to form a skin layer A and a skin layer B each having a thickness of 2 μm from the cellulose acylate solution for high-substitution layer. The formed film was peeled away from the band, clipped, and fed at 140 degrees Celsius by a tenter while the residual solvent amount was 20% relative to the total mass of the film, using a tenter. Next, the film was unclipped, dried at 130 degrees Celsius for 20 minutes and stretched in the transverse direction by 23% at a stretching temperature of 180 degrees Celsius by using a tenter. In this way, a film was prepared. This was used as Film 9.

(10) Preparation of Film 10:

Cellulose acylate propionate, CAP482-20 (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), IRGANOX-1010 (by Ciba Specialty Chemicals) (0.5% by mass) were added thereto, and mixed for 30 minutes with a tumbler mixer. The resulting mixture was dried with a moisture-removing hot air drier (Matsui Seisaku-sho's DMZ2), at a hot air temperature of 150 degrees Celsius and at a dew point of −36 degrees Celsius. Next, the mixture was fed into a double-screw extruder (by Technovel); and with adding thereto a mat agent, AEROSIL 200V (0.016-μm silica fine particles by Nippon Aerosil) through the additive hopper port provided in the intermediate part of the extruder via a continuous feeder so that its throughput flow could be 0.05%, and also thereto, a UV absorbent, TINUVIN 360 (by Ciba Specialty Chemicals) through the same port to be at a throughput flow of 0.5%, the mixture was melt-extruded. Thus melt-extruded, the film formed had a thickness of 180 μm.

The film was biaxially stretched at a temperature of 142 degrees Celsius in MD by 1.1 times and in TD by 2.2 times with its edges fixed. This was used as Film 10. The thickness of the film was 74 μm.

Although, according to the above example, as a process for preparing the film, containing cellulose acylate propionate, the process employing the melt extrusion method was described, it may be possible to prepare any films exhibiting the same effect as Film 10 according to a solution-casting method (the cellulose acylate to be used in the method may be selected from any cellulose acylates having the acetyl-substitution degree of about 1.6 and the propionyl-substitution degree of about 0.9 in terms of solubility).

(11) Preparation of Film 11:

The norbornene film built in Toshiba's liquid-crystal panel "32C7000" was peeled, and an easy-adhesion layer was formed on the film. This was used as Film 11. The thickness of the film was 70 μm.

(12) Preparation of Film 12:

A film was produced in the same manner as that for Film 6, for which, however, the cellulose acylate shown in the Table below was used as the starting material and the production condition was changed to the Table below. This was used as Film 12.

| | Cellulose acylate film | Film 12 |
|---|---|---|
| Cellulose Acylate | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1) |
| | Amount [parts by mass relative to 100 parts by mass of cellulose] | 6.4 |
| Plasticizer | Plasticizer Type | TPP/BDP |
| | Amount [parts by mass relative to 100 parts by mass of cellulose] | 7.8/3.9 |
| Stretching condition | Ratio of longwise stretching [%] | 3 |
| | Ratio of cross stretching [%] | 35 |
| | Ratio of shrinking [%] | 7 |
| | Stretching speed [%/min] | 35 |
| | Film surface temperature [° C.] | 120 |
| | Amount of residual solvent at the time of peeling off [%] | 50 |
| | Amount of residual solvent at the time of termination of stretching [%] | 10 |

(13) Preparation of Film 13:
1) Cellulose Acylate:

Following cellulose acylate B was used. The cellulose acylate was heated at 120 degrees Celsius and dried so that its water content could be at most 0.5% by mass, and 20 parts by mass of the thus-dried cellulose acylate was used here.

Cellulose Acylate B:

A powder of cellulose acylate having a degree of substitution of 2.86 was used. The viscosity-average degree of polymerization of the cellulose acylate B was 300, the degree of acetyl substitution at the 6-position thereof was 0.89, the acetone extract was 7% by mass, the ratio of mass-average molecular weight/number-average molecular weight was 2.3, the water content was 0.2% by mass, the viscosity in a 6 mas. % dichloromethane solution was 305 mPa·s, the residual acetate amount was at most 0.1% by mass, the Ca content was 65 ppm, the Mg content was 26 ppm, the iron content was 0.8 ppm, the sulfate ion content was 18 ppm, the yellow index was 1.9, and the free acetic acid amount was 47 ppm. The mean particle size of the powder was 1.5 mm, and the standard deviation thereof was 0.5 mm.

2) Solvent:

The following solvent A was used here. The water content of each solvent was at most 0.2% by mass.

Solvent A:

Dichloromethane/methanol=90/10 by mass

3) Additive:

Of the following additives A and B, one as indicated in Table 4 below was selected and used here.

Additive A:

Silicone dioxide fine particles (particle size, 20 nm; Mohs hardness, about 7) (0.08 mas.pts.)

4) Dissolution:

According to the following dissolution step A, the cellulose acetate was swollen or dissolved.

Dissolution Step A:

The above-mentioned solvent and additive were put into a 400-liter stainless dissolver tank having a stirring blade and cooled with cooling water circulating around it, and with stirring and dispersing them, the above-mentioned cellulose acylate was gradually added thereto. After the addition, this was stirred at room temperature for 2 hours and swollen for 3 hours, and then again stirred to give a swollen cellulose acylate solution.

For the stirring, used were a dissolver-type eccentric stirring shaft stirring at a peripheral speed of 15 m/sec (shear stress $5 \times 10^4$ kgf/m/sec$^2$ [$4.9 \times 10^5$ N/m/sec$^2$]), and a stirring shaft having an anchor blade around the center axis and stirring at a peripheral speed of 1 m/sec (shear stress $1 \times 10^4$ kgf/m/sec$^2$ [$9.8 \times 10^4$ N/m/sec$^2$]). For the swelling, the high-speed stirring shaft was stopped and the peripheral speed of the stirring shaft having an anchor blade was kept at 0.5 m/sec.

From the tank, the swollen solution was heated up to 50 degrees Celsius in a jacketed pipe, and further heated up to 90 degrees Celsius under a pressure of 2 MPa for complete dissolution. The heating time was 15 minutes. In this process, the filter, the housing and the pipe exposed to high temperature were all made of a hastelloy alloy excellent in corrosion resistance and were equipped with a jacket through which a heat carrier for heating the solution and keeping the solution warm was circulated.

Next, this was cooled to 36 degrees Celsius to give a cellulose acylate solution.

5) Filtration:

Thus obtained, the cellulose acylate solution was filtered through filter paper having an absolute filtration accuracy of 10 μm (#63, by Toyo Filter Paper) and then through a sintered metal filter having an absolute filtration accuracy of 2.5 μm (FH025, by Paul) to give a filtered polymer solution.

(Production of Film)

A film was produced according to the following film production process A.

Film Production Process A:

The above-mentioned cellulose acylate solution was heated at 30 degrees Celsius, and then cast onto a mirror-face stainless support having a band length of 60 m set at 15 degrees Celsius through a caster, Geeser (described in JP-A 11-314233). The casting speed was 50 m/min, and the coating width was 200 cm. The space temperature in the entire casting zone was set at 15 degrees Celsius. At 50 cm before the end point of the casting zone, the cellulose acylate film thus cast and rolled was peeled off from the band, and exposed to dry air at 45 degrees Celsius applied thereto. Next, this was further dried at 110 degrees Celsius for 5 minutes and at 140 degrees Celsius for 10 minutes, thereby giving a transparent cellulose acylate film.

(Stretching)

As shown in Table below, the film was stretched according to the following stretching process A.

Stretching Process A:

The obtained film was stretched using an apparatus having a heating zone between two nip rolls. The distance between the nip rolls was so controlled that the aspect ratio (distance between nip rolls/base inlet port width) could be 0.1, and the base temperature before the heating zone was 25 degrees Celsius. The temperature in the heating zone was as in Table 4 below. By controlling the speed ratio of the speed of the feeding nip rolls to the speed of the taking-out nip rolls, the draw ratio in stretching was controlled as in Table low.

|  | Cellulose acylate | Additive | Step | Stretching Temperature [° C.] | Stretching [%] |
|---|---|---|---|---|---|
| Film 13 | B | A | A | 200 | 35 |

In this way, a film was prepared. This was used as Film 13.

(14) Preparation of Film 14:

A film was produced in the same manner as that for Film 6, except that the cellulose acylate shown in the Table below was used as the starting material and the production condition was changed to the Table below. This was used as Film 14. The abbreviations of the additive and the plasticizer mentioned below are the same as above.

|  | Cellulose acylate film | Film 14 |
|---|---|---|
| Cellulose Acylate | Cellulose Type | CTA |
|  | Total degree of substitution | 2.81 |
|  | Ratio of 6-position substitution | 0.320 |
|  | Degree of 6-position substitution | 0.9 |
|  | Substituent | Ac |
| Additive | Additive Type | Retardation enhancer (1) |
|  | Amount [parts by mass relative to 100 parts by mass of cellulose] | 7.2 |
| Plasticizer | Plasticizer Type | TPP/BDP |
|  | Amount [parts by mass relative to 100 parts by mass of cellulose] | 7.8/3.9 |
| Stretching condition | Ratio of longwise stretching [%] | 35 |
|  | Ratio of cross stretching [%] | 75 |
|  | Ratio of shrinking [%] | 7 |
|  | Stretching speed [%/min] | 100 |
|  | Film surface temperature [° C.] | 160 |
|  | Amount of residual solvent at the time of peeling off [%] | 45 |
|  | Amount of residual solvent at the time of termination of stretching [%] | 10 |

(15) Preparation of Film 15:

A film was produced in the same manner as that for Film 6, except that the cellulose acylate shown in the Table below was used as the starting material and the production condition was changed to the Table below. This was used as Film 15. The abbreviations of the additive and the plasticizer mentioned below are the same as above.

| | Cellulose acylate film | Film 15 |
|---|---|---|
| Cellulose Acylate | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1) |
| | Amount [parts by mass relative to 100 parts by mass of cellulose] | 2.2 |
| Plasticizer | Plasticizer Type | TPP/BDP |
| | Amount [parts by mass relative to 100 parts by mass of cellulose] | 7.8/3.9 |
| Stretching condition | Ratio of longwise stretching [%] | 6 |
| | Ratio of cross stretching [%] | 47 |
| | Ratio of shrinking [%] | 7 |
| | Stretching speed [%/min] | 35 |
| | Film surface temperature [° C.] | 120 |
| | Amount of residual solvent at the time of peeling off [%] | 55 |
| | Amount of residual solvent at the time of termination of stretching [%] | 12 |

(16) Preparation of Film 16:
<Production of Cyclic Polyolefin Polymer P-1>

100 parts by mass of pure toluene and 100 parts by mass of methyl norbornene-carboxylate were put into a reactor. Next, 25 mmol % (relative to the monomer) of ethyl hexanoate-Ni and 0.225 mol % (relative to the monomer) of tri(pentafluorophenyl)boron dissolved in toluene, and 0.25 mol % (relative to the monomer) of triethylaluminium dissolved in toluene were added to the reactor. With stirring at room temperature, these were reacted for 18 hours. After the reaction, the reaction mixture was put into excessive methanol to form a polymer precipitate. The precipitate was purified, and the resulting cyclic polyolefin polymer (P-1) was dried in vacuum at 65 degrees Celsius for 24 hours.

The produced polymer was dissolved in tetrahydrofuran, and its molecular weight was measured through gel permeation chromatography. The polystyrene-equivalent, number-average molecular weight of the polymer was 79,000, and the weight-average molecular weight thereof was 205,000. The produced polymer was analyzed with an Abbe's refractometer, and its refractive index was 1.52.

| (Polyolefin Dope D-1) | |
|---|---|
| Cyclic polyolefin polymer P-1 | 150 mas. pts. |
| Additive, polymethyl acrylate (Soken Chemical's Actflow UMM 1001; weight-average molecular weight Mw, about 1000) | 7.5 mas. pts. |
| Antioxidant, Ciba Specialty Chemicals' IRGANOX 1010 | 0.45 mas. pts. |
| Dichloromethane | 620 mas. pts. |

The above composition was put into a mixing tank and stirred to dissolve the ingredients. The solution was filtered through a paper filter having a mean pore size of 34 μm and a sintered metal filter having a mean pore size of 10 μm thereby preparing a cyclic polyolefin dope D-1. The dope was cast, using a band caster. Peeled from the band, the film having a residual solvent amount of about 30% by mass was dried with hot air at 140 degrees Celsius applied thereto, using a tenter. Subsequently, the tenter transference was changed to roll transference, and the film was further dried at 120 degrees Celsius to 140 degrees Celsius and wound up. The film was used as Film 16. The film thickness was 80 μm.

(17) Preparation of Film 17:

Cellulose acetate benzoate 17A was produced according to the production method for the comparative compound C-3 in JP-A 2008-95027, for which, however, 4-methoxycinnamic acid chloride used as the intermediate 2 was changed to benzoyl chloride.

<Preparation of Cellulose Acylate Solution>

The following materials were put into a mixing tank and stirred under heat to dissolve the ingredients, thereby preparing a cellulose acylate solution.

| Cellulose Acylate Solution | |
|---|---|
| Cellulose acetate benzoate 17A | 100 mas. pts. |
| Methylene chloride | 403.0 mas. pts. |
| Methanol | 60.2 mas. pts. |

The thus-prepared cellulose acylate solution was immediately cast, using a band caster. The film having a residual solvent amount of about 30% by mass was dried with hot air at 160 degrees Celsius applied thereto, using a tenter.

Further, the film was monoaxially stretched by 1.5 times at a temperature of 160 degrees Celsius, with its edges kept fixed. This was used as Film 17. The film thickness was 55 μm.

2. Properties of Films 1-17:

The properties of Films 1-17 are shown in the following Table. Re(550) and Rth(550) of each film were measured as follows: A sample having a size of 30 mm×40 mm of each film was conditioned at 25 degrees Celsius and 60% RH for 2 hours, and analyzed with KOBRA 21ADH (by Oji Scientific Instruments) at a wavelength of 550 nm. For Films 1, 3-10, 12-15, and 17, an assumed mean refractive index of 1.48 and the film thickness were inputted and the data were computed. For the other films, the assumed refractive index was 1.53 for Films 2 and 11, and 1.52 for Film 16.

| Film | Thickness (μm) | Re(550) (nm) | Rth(550) (nm) |
|---|---|---|---|
| Film 1 | 80 | 0.8 | 43 |
| Film 2 | 45 | 0.2 | 43 |
| Film 3 | 34 | 2.1 | 43 |
| Film 4 | 42 | 0.5 | 43 |
| Film 5 | 60 | 1.0 | 1.1 |
| Film 6 | 78 | 3 | 90 |
| Film 7 | 78 | 3 | 95 |
| Film 8 | 55 | 55 | 115 |
| Film 9 | 118 | 61 | 208 |
| Film 10 | 74 | 61 | 208 |
| Film 11 | 70 | 61 | 208 |
| Film 12 | 82 | 61 | 208 |
| Film 13 | 50 | 10 | 25 |
| Film 14 | 55 | 67 | 223 |
| Film 15 | 78 | 83 | 165 |
| Film 16 | 80 | 30 | 250 |
| Film 17 | 55 | 275 | −69 |

In the same manner, Re and Rth of the films in the following Table were measured at a wavelength of 450 nm, 550 nm and 630 nm.

| | Re(nm) | | | Wavelength- | Rth(nm) | | | Wavelength- |
|---|---|---|---|---|---|---|---|---|
| | 450 nm | 550 nm | 630 nm | dispersion *1 | 450 nm | 550 nm | 630 nm | dispersion *1 |
| Film 1 | −3.3 | 0.8 | 3.2 | Reversed | 32 | 43 | 47 | Reversed |
| Film 2 | 0.2 | 0.2 | 0.2 | Flat | 43 | 43 | 43 | Flat |
| Film 3 | 2.6 | 2.1 | 1.7 | Normal | 54 | 43 | 40 | Normal |
| Film 9 | 58.5 | 61.0 | 62.0 | Reversed | 201.0 | 208.0 | 211.0 | Reversed |
| Film 10 | 52.0 | 61.0 | 65.5 | Reversed | 195.0 | 208.0 | 221.0 | Reversed |
| Film 11 | 61.0 | 61.0 | 61.0 | Flat | 208.0 | 208.0 | 208.0 | Flat |
| Film 12 | 64.5 | 61.0 | 60.0 | Normal | 214.0 | 208.0 | 207.5 | Normal |

*1 "reversed": Re or Rth shows the reversed wavelength-dispersion; "flat": Re or Rth is constant with wavelength variation; "normal": Re or Rth shows the normal wavelength-dispersion 3. Production of Polarizing Plate:

A polyvinyl alcohol (PVA) film having a thickness of 80 µm was dyed by dipping it in an aqueous iodine solution having an iodine concentration of 0.05% by mass at 30 degrees Celsius for 60 seconds, then stretched in the machine direction by 5 times the original length while dipped in an aqueous boric acid solution having a boric acid concentration of 4% by mass for 60 seconds, and thereafter dried at 50 degrees Celsius for 4 minutes to give a polarizing film having a thickness of 20 µm.

Of the films shown in the above Table, the films containing a cellulose acylate were saponified as follows: Each film was dipped in an aqueous sodium hydroxide solution (1.5 mol/liter) at 55 degrees Celsius, and then fully rinsed with water to remove sodium hydroxide. Next, this was dipped in an aqueous diluted sulfuric acid solution (0.005 mol/liter) at 35 degrees Celsius for 1 minute, and then dipped in water to fully remove the aqueous diluted sulfuric acid solution. Finally, the sample was fully dried at 120 degrees Celsius.

Any two sheets of the films (films 1 to 17) were stuck, using an adhesive, with the polarizing film sandwiched therebetween to thereby produce a polarizing plate having a protective film on both surfaces. For the cellulose acylate films, a polyvinyl alcohol adhesive was used, and for the other films, an acrylic adhesive was used to stick them to the polarizing element. The combination is shown in Table below.

In the following Table, the film marked with "*1" means a retardation film serving as a protective film for polarizing plate, as disposed further outside toward the panel side than the polarizing film; the film marked with "*2" means a retardation film serving as a protective film for polarizing plate, as disposed between the liquid-crystal cell and the polarizing film; and the film marked with "*3" means a retardation film serving as a protective film for polarizing plate, as disposed further outside toward the backlight side than the polarizing film. The same shall apply to all the following Tables.

Films 8 to 17 were so stuck that the in-plane slow axis thereof could be in parallel to the transmission axis of the polarizing element; and Films 1 to 7 and 6 to 18 were so stuck that the in-plane slow axis thereof could be orthogonal to the transmission axis of the polarizing element. The films having an easy-adhesion layer were so stuck that the easy-adhesion layer therein could face the surface side of the polarizing element.

4. Production and Evaluation of VA-Mode Liquid-Crystal Display Device:

(1) Preparation of VA-Mode Liquid-Crystal Cells 1 to 6:

In this Example, in case where a color filter is formed on a TFT, an organic developer CD2000 (by FUJIFILM Electronic Materials) was used.

(1)-1 Preparation of VA-Mode Liquid-Crystal Cell 1:

According to Example 20 described in JP-A 2009-141341, a TFT element was formed on a glass substrate, and a protective film was further formed on the TFT element. Subsequently, a contact hole was formed in the protective film, and a transparent electrode of ITO electrically connected to the TFT element was formed on the protective film, thereby producing an array substrate.

As a color photographic material, the composition prepared according to Examples 14, 22 and 25 described in JP-A 2009-203462 was used, and a color filter substrate was prepared according to the process described in Example 9a in [0099] to [0103] in JP-T 2008-516262.

A transparent electrode of ITO was formed through sputtering on the color filter substrate formed in the above, and then according to Example 1 in JP-A 2006-64921, a spacer was formed in the part corresponding to the upper part of the partition wall (black matrix).

The transparent electrode on the array substrate and that on the color filter substrate formed in the above were patterned for PVA-mode, and a vertical alignment film of polyimide was formed thereon.

Subsequently, a UV-curable resin sealant was applied, using a dispenser, to the position corresponding to the black matrix frame provided around the RGB pixel group of the color filter, then a PVA-mode liquid crystal was dropwise applied thereto, and stuck to the array substrate. Thus stuck together, the substrates were exposed to UV rays, and then heat-treated to cure the sealant, thereby producing a liquid-crystal cell.

Subsequently, Δnd(550) of the formed liquid-crystal cell was measured with AXOMETRICS' AXOSCAN using the associated software. One having Δnd(550) of 300 nm was selected, and this was used as Liquid-crystal Cell 1.

As the light source of Liquid-crystal Cell 1, used was the backlight in the above-mentioned LC-32 GH5, and the light source was disposed on the side of the array substrate.

(1)-2 Preparation of VA-Mode Liquid-Crystal Cell 2:

Liquid-crystal Cell 2 was prepared in the same manner as Liquid-crystal Cell 1, except that another array substrate, having the increased number of arrays per unit area by changing a TFT element structure, and another color filter substrate, formed by using a composition prepared according to Examples 14, 22 and 27 described in JP-A 2009-203462 as a color photographic material, were used.

Subsequently, Δnd(550) of the formed liquid-crystal cell was measured with AXOMETRICS' AXOSCAN using the associated software. One having Δnd(550) of 300 nm was selected, and this was used as Liquid-crystal Cell 2.

As the light source of Liquid-crystal Cell 2, used was the backlight in the above-mentioned LC-32 GH5, and the light source was disposed on the side of the array substrate.

(1)-3 Preparation of VA-Mode Liquid-Crystal Cell 3:

Liquid-crystal Cell 3 was prepared in the same manner as Liquid-crystal Cell 1, except that another array substrate, having a different TFT element structure, was used.

Subsequently, Δnd(550) of the formed liquid-crystal cell was measured with AXOMETRICS' AXOSCAN using the associated software. One having Δnd(550) of 300 nm was selected, and this was used as Liquid-crystal Cell 3.

As the light source of Liquid-crystal Cell 3, used was the backlight in the above-mentioned LC-32 GH5, and the light source was disposed on the side of the array substrate.

(1)-4 Preparation of VA-Mode Liquid-Crystal Cell 4:

A liquid crystal panel, "LC-32DE5" by SHARP, was prepared. We found that this liquid crystal cell is one of the liquid crystal cells having the high front CR among the commercially available VA-mode liquid crystal cell. This was used as Liquid-crystal Cell 4.

Subsequently, Δnd(550) of the formed liquid-crystal cell was measured with AXOMETRICS' AXOSCAN using the associated software, and it was found that Δnd(550) of the cell was 300 nm.

As the light source of Liquid-crystal Cell 4, used was the backlight in the above-mentioned LC-32 GH5, and the light source was disposed on the side of the substrate having a TFT array thereon.

(1)-5 Preparation of VA-Mode Liquid-Crystal Cell 5:

According to Example 20 in JP-A 2009-141341, a TFT element was formed on a glass substrate, and a protective film was formed on the TFT element.

Subsequently, using a coloring photosensitive composition prepared according to Examples 17, 18 and 19 in JP-A 2009-144126 and according to the process of Example 9a in JP-T 2008-516262, [0099]-[0103], a color-filter-on-array (COA) substrate was formed on the above protective film. In this, however, the concentration of the pigment in the coloring photosensitive resin composition for each pixel was halved, and an amount of the coating composition was controlled so that the black pixel could have a thickness of 4.2 μm and the red pixel, the green pixel, and the blue pixel could have a thickness of 3.5 μm each. Further, a contact hole was formed in the color filter, and then, a transparent pixel electrode of ITO (indium tin oxide), as electrically connected to the TFT element, was formed on the color filter. Next, according to Example 1 in JP-A 2006-64921, a spacer was formed on the ITO film in the area corresponding to the upper part of the partitioning wall (black matrix).

Separately, a glass substrate was prepared with a transparent electrode of ITO formed thereon, as a counter substrate. The transparent electrode of the COA substrate and the counter substrate was patterned for PVA mode, and a vertical alignment film of polyimide was formed thereon.

Afterwards, a UV-curable resin sealant was applied to the position corresponding to the black matrix frame disposed in the periphery to surround the RGB pixel group of the color filter, according to a dispenser system, then a PVA-mode liquid crystal was dropwise applied thereto, and this was stuck to the counter substrate. The thus-stuck substrates were irradiated with UV and heat-treated to cure the sealant. According to the process, a liquid-crystal cell was produced.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 5.

As the light source for Liquid-crystal Cell 5, used was the backlight used in the above LCD-40MZW100, and the light source was disposed on the side of the array substrate.

(1)-6 Preparation of VA-Mode Liquid-Crystal Cell 6:

According to Example 20 described in JP-A 2009-141341, a TFT element was formed on a glass substrate, and a protective film was further formed on the TFT element. Subsequently, a contact hole was formed in the protective film, and a transparent electrode of ITO electrically connected to the TFT element was formed on the protective film. Next, a transparent pillar-like spacer pattern having a diameter of 16 μm and a mean height of 3.7 μm was formed on the ITO film, thereby producing an array substrate.

Separately, a glass substrate with a transparent electrode of ITO formed thereon was prepared as a counter substrate, and the transparent electrode on the array substrate and that on the counter substrate were patterned for PVA-mode, and a vertical alignment film of polyimide was formed thereon.

A UV-curable resin sealant was applied, using a dispenser, above the pillar-like spacer of the array substrate like the pattern as in Liquid-crystal Cell 5, then a PVA-mode liquid crystal was dropwise applied thereto, and stuck to the counter substrate. Thus stuck together, the substrates were exposed to UV rays, and then heat-treated to cure the sealant, thereby producing a liquid-crystal cell.

Subsequently, Δnd(550) of the formed liquid-crystal cell was measured with AXOMETRICS' AXOSCAN using the associated software. One having Δnd(550) of 300 nm was selected, and this is Liquid-crystal Cell 6.

As the light source of Liquid-crystal Cell 6, prepared was a backlight unit of which the drive system was so controlled that the LEDs of three colors BGR could alternately emit at 180 Hz, and the light source was disposed on the side of the array substrate.

(2) Computation of Member Contrast Ratios of the Front-Side Substrate and the Rear-Side Substrate of the Liquid-Crystal Cell:

The member contrast ratio of the rear-side substrate and the front-side substrate of the liquid-crystal cell is meant to indicate the total contrast ratio of each substrate and each member formed on each substrate. Examples of the member include all members of color filter, black matrix, array member (TFT array, etc.), projection on substrate, common electrode, slit, etc.

Two substrates or that is the front-side substrate and the rear-side substrate to form each liquid-crystal cell were separated from each other to the individual front-side substrate and rear-side substrate; and each substrate was washed with ethanol. Subsequently, the member contrast ratio of the front-side substrate (including the front-side substrate and all the members formed on the substrate), and that of the rear-side substrate (including the rear-side substrate and all the members formed on the substrate) were computed according to the following method.

A polarizing plate (HLC2-2518, by Sanritz) was put on the backlight of a liquid-crystal panel, Sharp's LC-32 GH5, and on this, the front-side substrate or the rear-side substrate prepared by disassembling each liquid-crystal cell, as fitted to a rotary stage SGSP-120YAW (by Sigma Koki), was disposed in parallel to each other at a distance of 2 mm from the polarizing plate. Briefly, these were so disposed that the TFT array wiring on the substrate and the lattice pattern of the black matrix could correspond to the polarization axis of the polarizing plate. Further on this, a polarizing plate, HLC2-2518 (by Sanritz) fitted to a rotary stage was disposed so that the distance between the polarizing plates could be 52 mm. Using a tester BM5A (by TOPCON) in a dark room, the brightness in the black and white states of display in the normal direction was measured, and the front contrast ratio A (white brightness/black brightness) was computed. In this, the polarizing plate was rotated, and the lowest brightness was the brightness in the black state. Then, the polarizing plate was rotated by 90 degrees, and the brightness in this stage was the brightness in the white state.

Next, in the above embodiment, the front-side substrate or the rear-side substrate was removed, and the brightness in the black or white state of display with the polarizing plate alone was measured, and the front contrast ratio B was computed.

To remove the influence of the front contrast ratio B with the polarizing plate on the front contrast ratio A, the member contrast ratio was computed according to the following formula:

The member contrast ratio=1−(1/the front CRA−1/the front contrast ratio B).

Further, the ratio of the member contrast ratio of the front-side substrate (the member CR(front)) to the member contrast ratio of the rear-side substrate (the member CR(rear)), (the member CR(front)/the member CR(rear)), was calculated regarding each of the cells. The results were shown in the following table.

(3) Measurement of Front-Member Scattering Intensity of Each Liquid-Crystal Cell:

For the measurement, the following polarizing plates 1 and 2 were prepared.

Polarizing plate 1 was produced by putting a polarizing film between two of Film No. 1, of which Re(550) and Rth (550) were 0 nm. Polarizing plate 2 was produced by putting a polarizing film between two of Film No. 2, of which Re(550) and Rth(550) were 60 nm and 210 nm respectively.

As the light source for the measurement, used was the backlight of Sharp's liquid-crystal panel "LC-32 GH5". The backlight of "LC-32 GH5" has a brightness of from 0.55 to 0.65 in three directions at a polar angle of 40 degrees and at an azimuth angle of 0 degree, 45 degrees or 90 degrees, based on the front brightness of 1.

Each sample for measurement of the front-side substrates of the liquid crystals cell were prepared by disassembling them respectively according to the same method as (2).

Any of Polarizing Plate 1 or 2 was disposed on the light source, and the front-side substrate of each liquid-crystal cell, prepared as in the above, was fitted to a rotary stage (SGSP-120YAW, by Sigma Koki) was disposed in parallel to each other at a distance of 2 mm from the polarizing plate. Briefly, these were so disposed that the TFT array wiring and the lattice pattern of the black matrix on the substrate could correspond to the polarization axis of the polarizing plate. Further on this, a polarizing plate, HLC2-2518 (by Sanritz) fitted to a rotary stage was disposed so that the distance between the polarizing plates could be 52 mm. Using a tester BM5A (by TOPCON) in a dark room, the brightness in the black and white states of display in the normal direction was measured, and the front contrast ratio A (white brightness/black brightness) was computed. In this, the polarizing plate was rotated, and the lowest brightness was the brightness in the black state. Then, the polarizing plate was rotated by 90 degrees, and the brightness in this state was the brightness in the white state.

Next, under the above-mentioned condition, the front-side substrate was removed, and the brightness in the black or white state of display with the polarizing plate alone was measured, and the front contrast ratio B was computed.

To remove the influence of the front contrast ratio B with the polarizing plate on the front contrast ratio A, the member contrast ratio was computed according to the following formula:

The member Contrast ratio={1/1/the front contrast ratio A}−{1/the front contrast ratio B}.

In this, the front-side substrate contrast ratio measured with Polarizing Plate 1 is the member CR(front 1) and the member CR(rear 1), and the front-side substrate contrast ratio measured with Polarizing Plate 2 is the member CR(front 2) and the member CR(rear 2); and the front member scattering intensity was computed according to the following formulae:

The front-member scattering intensity={1/The member CR(front 2)}−{1/The member CR(front 1)},

| | And (nm) | Front-member Scattering Intensity (F) | CR(F)/CR(R) *1 | ≥3 *2 | F ≤ 1/38000 *3 |
|---|---|---|---|---|---|
| Liquid Crystal Cell 1 | 300 | 38000 | 3.0 | ○ | ○ |
| Liquid Crystal Cell 2 | 300 | 31000 | 3.0 | ○ | X |
| Liquid Crystal Cell 3 | 300 | 38000 | 2.1 | X | ○ |
| Liquid Crystal Cell 4 | 300 | 37200 | 2.1 | X | X |
| Liquid Crystal Cell 5 | 300 | 315000 | 40 | ○ | ○ |
| Liquid Crystal Cell 6 | 300 | 315000 | 27 | ○ | ○ |

*1: " CR(F)/CR(R) means "the member CR(rear 1)/the member CR(front 2)".
*2: "○" means that the member CR(rear 1)/the member CR(front 2) is equal to or more than 3; and "X" means that the member CR(rear 1)/the member CR(front 2) is smaller than 3.
*3: "○" means that the relation of the front-member scattering intensity ≤1/38000 is satisfied; and "X" means that the relation of the front-member scattering intensity ≤1/38000 is not satisfied.

(4) Evaluation of VA-Mode Liquid-Crystal Display Device:

Thus constructed, the liquid-crystal display devices were evaluated as follows:

(4)-1 Measurement of Front Contrast Ratio Ratio:

Using a tester BM5A (by TOPCON) in a dark room, the brightness in the black and white states of display in the normal direction to the panel was measured, and from the data, the front contrast ratio (white brightness/black brightness) was computed.

In this, the distance between the tester and the panel was 700 mm.

Subsequently, on the basis of the front contrast ratio in the standard state, the front contrast ratio was computed according to the following formula:

Front Contrast Ratio=front contrast in practical state/front contrast in standard state.

Regarding the standard state of each liquid-crystal cell, the liquid-crystal display device comprising Liquid-crystal Cell 1 is based on the liquid-crystal display device of Comparative Example 1; the liquid-crystal display device comprising Liquid-crystal Cell 2 is based on the liquid-crystal display device of Comparative Example 7; the liquid-crystal display device comprising Liquid-crystal Cell 3 is based on the liquid-crystal display device of Comparative Example 11; the liquid-crystal display device comprising Liquid-crystal Cell 4 is based on the liquid-crystal display device of Comparative Example 15; the liquid-crystal display device comprising Liquid-crystal Cell 5 is based on the liquid-crystal display device of Comparative Example 18; and the liquid-crystal display device comprising Liquid-crystal Cell 6 is based on the liquid-crystal display device of Comparative Example 21. The front contrast ratio of the liquid-crystal display of Comparative Example 1 was 3790; that of the liquid-crystal display device of Comparative Example 7 was 3060; that of the liquid-crystal display device of Comparative Example 11 was 4830; that of the liquid-crystal display device of Comparative Example 15 was 4740; and that of the liquid-crystal display device of Comparative Example 18 was 3730; and that of the liquid-crystal display device of Comparative Example 21 was 5530.

(4)-2 Viewing Angle Contrast Ratio (Contrast Ratio in Oblique Direction):

Using a tester BM5A (by TOPCON) in a dark room, the brightness in the black and white states of display was measured in three directions from the front of the device at a polar angle of 60 degrees and at an azimuth angle of 0 degree, 45 degrees or 90 degrees. From the data, the viewing angle contrast ratio (white brightness/black brightness) was computed, and the viewing angle characteristics of the liquid-crystal display devices were evaluated as follows:

A: The viewing angle contrast ratio is equal to or more than 50 in every direction, and no light leakage is recognized.

B: The minimum value of the viewing angle contrast ratio is equal to or more than 25 and less than 50, and slight light leakage is recognized but on an acceptable level.

C: The minimum value of the viewing angle contrast ratio is less than 25, and significant light leakage is recognized on an unacceptable level.

(4)-3 Front Blackness:

Using a tester BM5A (by TOPCON) in a dark room, the panels were checked for the color shift in the black state in panel normal direction, and color shift in blue was seen. The panels were evaluated for the front blackness based on the value v' indicating blue. In this, the distance between the tester and the panel was 700 mm.

A: v' is equal to or more than 0.38, and no color shift in blue in the front is recognized.

B: v' is from 0.375 to less than 0.38, and slight color shift in blue in the front is recognized but on an acceptable level.

C: v' is less than 0.375, and color shift in blue is recognized on an unacceptable level.

The results are shown in the following Table.

| No. | Front-side Film*1 | Front-side Film*2 (Rth) | Liquid Crystal Cell | Rear-side Film*2 (Rth) | Rear-side Film*3 | CR(F)/CR(R) ≥ 3*4 | F ≤ 1/38000*5 | Front CR | Viewing Angle CR (CR value)*6 | Front Blackness (v' value) |
|---|---|---|---|---|---|---|---|---|---|---|
| Example 1 | 1 | 14 | 1 | 13 (25 nm) | 1 | ○ (3.0) | ○ | 105% | A | — |
| Example 2 | 1 | 9 (R*7) | 1 | 1 (43 nm, R*7) | 1 | | | 104% | A (67) | A (0.381) |
| Example 3 | 1 | 12 (N*7) | 1 | 1 (43 nm) | 1 | | | 104% | A (65) | — |
| Example 4 | 1 | 10 (R*7) | 1 | 1 (43 nm) | 1 | | | 104% | A (67) | — |
| Example 5 | 1 | 11 (F*7) | 1 | 1 (43 nm) | 1 | | | 104% | A (66) | — |
| Example 6 | 1 | 9 | 1 | 4 (43 nm) | 1 | | | 104% | A | — |
| Example 7 | 1 | 9 | 1 | 3 (43 nm, N*7) | 1 | | | 104% | A | B (0.375) |
| Example 8 | 1 | 9 | 1 | 2 (43 nm, F*7) | 1 | | | 104% | A | B (0.379) |
| Example 9 | 1 | 16 | 1 | 17 (−69 nm) | 1 | | | 108% | A | — |
| Example 10 | 1 | 15 | 1 | 6 (90 nm) | 1 | | | 101% | A | — |
| Comparative Example 1 | 1 | 15 | 1 | 7 (95 nm) | 1 | | | 100% | A | — |
| Comparative Example 2 | 1 | 8 | 1 | 8 (115 nm) | 1 | | | 99% | A | — |
| Comparative Example 3 | 1 | 1 (R*7) | 1 | 9 (208 nm) | 1 | | | 93% | A (64) | — |
| Comparative Example 4 | 1 | 14 | 2 | 13 (25 nm) | 1 | ○ (3.0) | X | 103% | A | — |
| Comparative Example 5 | 1 | 9 | 2 | 1 (43 nm) | 1 | | | 103% | A | — |
| Comparative Example 6 | 1 | 15 | 2 | 6 (90 nm) | 1 | | | 100% | A | — |
| Comparative Example 7 | 1 | 15 | 2 | 7 (95 nm) | 1 | | | 100% | A | — |
| Comparative Example 8 | 1 | 8 | 2 | 8 (115 nm) | 1 | | | 99% | A | — |
| Comparative Example 9 | 1 | 1 | 2 | 9 (208 nm) | 1 | | | 94% | A | — |
| Comparative Example 10 | 1 | 9 | 3 | 1 (43 nm) | 1 | X (2.1) | ○ | 99% | A | — |
| Comparative Example 11 | 1 | 15 | 3 | 7 (95 nm) | 1 | | | 100% | A | C |
| Comparative Example 12 | 1 | 8 | 3 | 8 (115 nm) | 1 | | | 100% | A | — |
| Comparative Example 13 | 1 | 1 | 3 | 9 (208 nm) | 1 | | | 97% | A | — |
| Comparative Example 14 | 1 | 9 | 4 | 1 (43 nm) | 1 | X (2.1) | X | 98% | A | C |
| Comparative Example 15 | 1 | 15 | 4 | 7 (95 nm) | 1 | | | 100% | A | — |
| Comparative Example 16 | 1 | 8 | 4 | 8 (115 nm) | 1 | | | 101% | A | — |
| Comparative Example 17 | 1 | 1 | 4 | 9 (208 nm) | 1 | | | 99% | A | — |

-continued

| No. | Front-side Film*1 | Front-side Film*2 (Rth) | Liquid Crystal Cell | Rear-side Film*2 (Rth) | Rear-side Film*3 | CR(F)/ CR(R) ≥ 3*4 | F ≤ 1/38000*5 | Front CR | Viewing Angle CR (CR value)*6 | Front Blackness (v' value) |
|---|---|---|---|---|---|---|---|---|---|---|
| Example 11 | 1 | 9 (R*7) | 5 | 1 (43 nm, R*7) | 1 | ○ (40) | ○ | 116% | A (71) | A (0.383) |
| Example 12 | 1 | 12 (N*7) | 5 | 1 (43 nm) | 1 | | | 116% | A (69) | — |
| Example 13 | 1 | 10 (R*7) | 5 | 1 (43 nm) | 1 | | | 116% | A (72) | — |
| Example 14 | 1 | 11 (F*7) | 5 | 1 (43 nm) | 1 | | | 116% | A (70) | — |
| Example 15 | 1 | 9 | 5 | 4 (43 nm) | 1 | | | 116% | A | — |
| Example 16 | 1 | 9 | 5 | 3 (43 nm, N*7) | 1 | | | 116% | A | B (0.376) |
| Example 17 | 1 | 9 | 5 | 2 (43 nm, F*7) | 1 | | | 116% | A | A (0.380) |
| Example 18 | 1 | 16 | 5 | 17 (−69 nm) | 1 | | | 122% | A | |
| Comparative Example 18 | 1 | 15 | 5 | 7 (95 nm) | 1 | | | 100% | A | — |
| Comparative Example 19 | 1 | 8 | 5 | 8 (115 nm) | 1 | | | 98% | A | — |
| Comparative Example 20 | 1 | 1 (R*7) | 5 | 9 (208 nm) | 1 | | | 86% | A (66) | — |
| Example 19 | 1 | 9 | 6 | 1 (43 nm) | 1 | ○ (27) | ○ | 116% | A | — |
| Comparative Example 21 | 1 | 15 | 6 | 7 (95 nm) | 1 | | | 100% | A | — |
| Comparative Example 22 | 1 | 1 | 6 | 9 (208 nm) | 1 | | | 85% | A | |

*4: "CR(F)/CR(R) means "the member CR(rear 1)/the member CR(front 2)". "○" means that the member CR(rear 1)/the member CR(front 2) is equal to or more than 3; and "X" means that the member CR(rear 1)/the member CR(front 2) is smaller than 3.
*5: "F" means the front-member scattering intensity. "○" means that the relation of the front-member scattering intensity ≤1/38000 is satisfied; and "X" means that the relation of the front-member scattering intensity ≤1/38000 is not satisfied.
*6: The parenthesized numerical value is the contrast ratio value measured in the direction defined with a polar angle of 60 degrees and an azimuth angle of 45 degrees.
*7: for indicating the wavelength dispersion characteristics of Rth, and "R" means the reversed wavelength dispersion characteristics, "F" means that Re or Rth is constant with wavelength variation, and "N" means the normal wavelength dispersion characteristics.

From the data shown in the tables, it is understandable that, according to the examples employing any one of Liquid-crystal Cells 1, 5 and 6 (Examples 1-10 and 11-19), Rth of the retardation film disposed at the rear-side satisfied relation (3), that is, the relation of 25 nm≤Rth≤90 nm, thereby showed the high CR respectively. It is understandable also that, according to the comparative examples employing the retardation film having Rth of more than 90 nm (Comparative Examples 1-3 and 18-22), Rth of the retardation film disposed at the rear-side didn't satisfy relation (3), thereby showed the low CR respectively. The same can be said regarding the viewing angle CR.

Example 10, employing Film 6 (Rth=90 nm) as a rear-side retardation region showed the slightly higher front CR than that of Comparative Example 1 employing Film 7 (Rth=95 nm) as a rear-side retardation region. From this result, it is understandable that adjusting Rth of the rear-side retardation region to that range of equal to or smaller than 90 nm may be significant critically for improving the front CR of any liquid crystal display devices, employing a liquid crystal cell satisfying Formulas (1) and (2).

According to the comparative examples employing Liquid-crystal Cell 2 not satisfying Formula (2) (Comparative Examples 4-9), it is understandable that the comparative examples, in which the retardation film satisfying relation (3) is disposed as a rear-side retardation region, showed the high CR. However, since the comparative examples employed the liquid crystal cell not satisfying formula (2), the effect in improvement of the front CR was small. More specifically, the difference of the front CR between Comparative Example 6 employing Film 6 (Rth=90 nm) as a rear-side retardation region and Comparative Example 7 employing Film 7 (Rth=95 nm) as a rear-side retardation region was unrecognizable.

It is understandable that the comparative examples employing Liquid-crystal Cell 3 or 4 not satisfying formula (1) were not improved in terms of the front CR even though employing the retardation film of which Rth satisfied formula (3).

It is understandable that the examples, employing the retardation film of which Rth exhibited the reversed wavelength dispersion characteristics as a rear-side retardation region, showed the large value of v', which indicated that the front bluish coloration was reduced.

Regarding Example 2 and Comparative Example 14, they had the same construction, except that the former and the latter used Liquid-crystal Cell 1 satisfying formula (1) and Liquid-crystal Cell 4 not satisfying formula (1) respectively. Comparing Example 2 and Comparative Example 14, it is understandable that Example 2 was superior to Comparative Example 14 in terms of not only the front CR but the improvement in the front blackness.

It is understandable that, in terms of the viewing angle CR, the most preferable examples are the examples in which Rth of the front-side retardation region exhibited the reversed wavelength dispersion characteristics (see Examples 2, 4, 11 and 13), and the next preferable examples are the examples in which Rth of the front-side retardation region were constant without any dependency of the wavelength (see Examples 2, 4, 11 and 13), Two liquid crystal display devices were produced in the same manner as Examples 2 and 11 having Liquid crystal Cells 1 and 5 respectively, except that Film 1 was used as the front-side retardation region as well as the rear-side retardation region. Although these liquid crystal display devices showed the high front CR same as those of Examples 2 and 11, they showed were the lower front CR than those of Examples 2 and 11. Since these liquid crystal display devices contained Liquid crystal Cells 1 and 5, satisfying formulas (1) and (2), and Film 1 (Rth=43 nm), satisfying formula (3), as the rear-side retardation region, the effect of improving the front CR was obtained. On the other hand, since these liquid crystal display devices contained Film 1 also as the rear-side retardation region, they were inferior to the liquid crystal display devices of Examples 2 and 11 in terms of the viewing angle CR.

Two liquid crystal display devices were respectively produced in the same manner as Examples 2 and 11, having Liquid crystal Cells 1 and 5, except that Film 1 was used as the front-side retardation region as well as the rear-side retardation region. Although these liquid crystal display devices using some light sources respectively. And then, the front contrast ratio improvement ratio was determined according to the following formula:

Front Contrast ratio Improvement Ratio(%) of Liquid-crystal Cell 1={(the front contrast ratio of liquid-crystal display device of Example 2)−(the front contrast ratio of liquid-crystal display device of Comparative Example 1)}/(the front contrast ratio of liquid-crystal display device of Comparative Example 1).

Front Contrast ratio Improvement Ratio(%) of Liquid-crystal Cell 5={(the front contrast ratio of liquid-crystal display device of Example 11)−(the front contrast ratio of liquid-crystal display device of Comparative Example 18)}/(the front contrast ratio of liquid-crystal display device of Comparative Example 18).

|  | Light Source | Directionality | Directionality of Light Source (Ratio when assuming front brightness is 1) Polar angle of 45 degrees | | | Improvement Ratio (%) of Front Contrast ratio |
|---|---|---|---|---|---|---|
|  |  |  | Azimuth Angle 0 degree | Azimuth Angle 45 degrees | Azimuth Angle 90 degrees |  |
| Front Contrast ratio Improvement (%) Ratio of Liquid-crystal Cell 1 | (i) (ii) (iii) | Weak ↓ Strong | 0.53 0.63 0.28 | 0.54 0.38 0.32 | 0.54 0.32 0.32 | 4% 6% 7% |
| Front Contrast ratio Improvement (%) Ratio of Liquid-crystal Cell 5 | (i) (ii) (iii) | Weak ↓ Strong | 0.53 0.63 0.28 | 0.54 0.38 0.32 | 0.54 0.32 0.32 | 16% 18% 20% | showed the same high front CR as those of Examples 2 and 11, they showed the lower front CR than those of Examples 2 and 11. Since these liquid crystal display devices had Liquid crystal Cells 1 and 5, satisfying formulas (1) and (2), and Film 1 (Rth=43 nm), satisfying formula (3), disposed at the rear-side retardation region, the effect of improving the front CR was obtained. On the other hand, since these liquid crystal display devices contained Film 1 also disposed at the front-side retardation region, they were inferior to the liquid crystal display devices of Examples 2 and 11 in terms of the viewing angle CR.

(4)-4 Evaluation of Front Contrast Ratio in Change of Light Source:

Subsequently, the front contrast ratio in change of a light source was evaluated. As the light source, herein used were the backlights attached to the following three types of liquid-crystal panels:

(i) Sharp's liquid-crystal panel "LC-32GH5", (ii) Sharp's liquid-crystal panel "LC-37GX3W", (iii) Sharp's liquid-crystal panel "LC-32DE5".

The light source (i) does not have a prism sheet but has two diffusive sheets. The light source (iii) has two prism sheets. The light source (ii) has one lens array sheet stuck to a diffuser, in which the flat surface on the opposite side of the lens array sheet has a light-reflective layer to reflect light in the non-light-collecting region of the lens as formed thereon.

In the evaluation test, Liquid-crystal Cells 1 and 5 were used. Regarding the two liquid-crystal display devices of Example 2 and Comparative Example 1 employing Liquid-crystal Cell 1, and the two liquid-crystal display devices of Example 11 and Comparative Example 18 employing Liquid-crystal Cell 5, the front contrast ratios were measured by From the above results, it is known that use of the light source with higher directionality intensifies the effect of the invention more remarkably. The effect in front contrast ratio improvement of the invention may become more remarkable in any embodiments employing a high-contrast panel which may be provided in the future.

The invention claimed is:

1. A VA-mode liquid-crystal display device comprising:
a front-side polarizing element,
a rear-side polarizing element,
a VA-mode liquid-crystal cell disposed between the front-side polarizing element and the rear-side polarizing element, and
a rear-side retardation region composed of one or more retardation layers disposed between the rear-side polarizing element and the VA-mode liquid-crystal cell, wherein:
the liquid-crystal cell comprises a liquid-crystal layer, and a pair of a front-side substrate and a rear-side substrate to hold the liquid-crystal layer therebetween;
the ratio of the member contrast ratio of the front-side substrate (the member CR(front)) to the member contrast ratio of the rear-side substrate (the member CR(rear)), (the member CR(front)/the member CR(rear)) satisfies following formula (1):

$$3.0 \leq \{\text{the member CR(front)/the member CR(rear)}\}; \quad (1)$$

the total scattering intensity of the front-side substrate and all the members formed on the front-side substrate (hereinafter this is referred to as "the front-member scattering intensity") satisfies the following formula (2):

$$\text{The front-member scattering intensity} \leq 1/38000; \quad (2)$$

wherein the front-member scattering intensity is the difference between the reciprocal of the contrast ratio of all the substrate and all the members formed on the substrate, as measured by the use of a polarizing plate 2 of a combination of a high-retardation film and a polarizing element (the member CR(front 2)), and the reciprocal of the contrast ratio thereof, as measured by the use of a polarizing plate 1 of a combination of a low-retardation film and a polarizing element (member CR(front 1)), and this is computed according to the following formula:

The front-member scattering intensity={1/The member CR(front 2)−1/The member CR(front 1)}; and the rear-side retardation region satisfies the following formula (3):

$$25 \text{ nm} \leq Rth(550) \leq 90 \text{ nm} \tag{3}$$

wherein $Rth(\lambda)$ means retardation along the thickness-direction (nm) at a wavelength $\lambda$ nm.

2. The VA-mode liquid-crystal display device of claim 1, wherein the rear-side retardation region satisfies following formula (4):

$$|Re(550)| \leq 20 \text{ nm} \tag{4}$$

wherein $Re(\lambda)$ means retardation in plane (nm) at a wavelength $\lambda$ nm.

3. The VA-mode liquid-crystal display device of claim 1, which further comprises a front-side retardation region composed of one or more retardation layers disposed between the front-side polarizing element and the VA-mode liquid-crystal cell, and wherein the front-side retardation region satisfies following formulae (5) and (6):

$$30 \text{ nm} \leq Re(550) \leq 90 \text{ nm, and} \tag{5}$$

$$170 \text{ nm} \leq Rth(550) \leq 300 \text{ nm}. \tag{6}$$

4. The VA-mode liquid-crystal display device of claim 1, wherein the rear-side retardation region satisfies the following two formulae:

$$|Rth(450)|/|Rth(550)| \leq 1, \text{ and}$$

$$1 \leq |Rth(630)|/|Rth(550)|.$$

5. The VA-mode liquid-crystal display device of claim 1, wherein the rear-side retardation region is formed of a cellulose acylate-base film or comprises a cellulose acylate-base film.

6. The VA-mode liquid-crystal display device of claim 1, wherein the rear-side retardation region is formed of an acryl-base polymer film or comprises an acryl-base polymer film.

7. The VA-mode liquid-crystal display device of claim 6, wherein the rear-side retardation region is formed of an acryl-base polymer film comprising an acryl-base polymer having at least one unit selected from lactone ring units, maleic anhydride units and glutaric anhydride units, or comprises the acryl-base polymer film.

8. The VA-mode liquid-crystal display device of claim 1 wherein the rear-side retardation region is formed of a cyclic olefin-base polymer film or comprises a cyclic olefin-base polymer film.

9. The VA-mode liquid-crystal display device of claim 1 wherein the front-side retardation region is formed of one biaxial polymer film or comprises one biaxial polymer film.

10. The VA-mode liquid-crystal display device of claim 1, wherein the front-side retardation region comprises one monoaxial polymer film.

11. The VA-mode liquid-crystal display device of claim 9, wherein one biaxial polymer film is a cellulose acylate-base film or a cyclic olefin-base polymer film.

12. The VA-mode liquid-crystal display device of claim 10, wherein one monoaxial polymer film is a cellulose acylate-base film or a cyclic olefin-base polymer film.

13. The VA-mode liquid-crystal display device of claim 1, of which the front contrast ratio is equal to or higher than 1500.

14. The VA-mode liquid-crystal display device of claim 1, which comprises a backlight unit sequentially emitting independent three primary colors and which is driven according to a field sequential driving system.

\* \* \* \* \*